(12) United States Patent
Kim et al.

(10) Patent No.: US 10,263,679 B2
(45) Date of Patent: Apr. 16, 2019

(54) METHOD FOR SUPPORTING BEAMFORMING IN COMMUNICATION NETWORK

(71) Applicant: ELECTRONICS AND TELECOMMUNICATIONS RESEARCH INSTITUTE, Daejeon (KR)

(72) Inventors: Eun Kyung Kim, Daejeon (KR); Seung Kwon Baek, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/877,182

(22) Filed: Jan. 22, 2018

(65) Prior Publication Data
US 2018/0227026 A1 Aug. 9, 2018

(30) Foreign Application Priority Data

Jan. 23, 2017 (KR) .................. 10-2017-0010727
Jan. 19, 2018 (KR) .................. 10-2018-0006943

(51) Int. Cl.
*H04L 27/00* (2006.01)
*H04B 7/06* (2006.01)

(52) U.S. Cl.
CPC .................. *H04B 7/0617* (2013.01)

(58) Field of Classification Search
CPC ............................................ H04B 7/0617
USPC ........ 375/295, 260, 267, 296, 316; 370/280, 370/328, 342, 329, 344; 455/13.3, 63.4, 455/69, 427, 575.7, 56.1, 527, 436, 450, 455/500
See application file for complete search history.

(56) References Cited

U.S. PATENT DOCUMENTS

| | | |
|---|---|---|
| 6,661,374 B2 | 12/2003 | Kim et al. |
| 8,115,677 B2 | 2/2012 | Splett |
| 9,338,662 B2 | 5/2016 | Kim et al. |

(Continued)

FOREIGN PATENT DOCUMENTS

| | | |
|---|---|---|
| KR | 10-2016-0081777 A | 7/2016 |
| KR | 10-2016-0081780 A | 7/2016 |

*Primary Examiner* — Dhaval V Patel
(74) *Attorney, Agent, or Firm* — Rabin & Berdo, P.C.

(57) ABSTRACT

Disclosed are a method and an apparatus for performing communications based on multiple antennas in a communication network. An operation method performed in a multi-antenna performing beamforming in a communication network according to the present disclosure may comprise selecting a beamformer generating a transmission beam for transmitting data to a plurality of communication nodes included in the communication network among a plurality of beamformers included in the multi-antenna; selecting at least one antenna panel corresponding to each of the plurality of communication nodes among a plurality of antenna panels included in the selected beamformer; configuring parameters for respectively allocating independent transmission beams to the plurality of communication nodes based on the selected at least one antenna panel; and transmitting data to the plurality of communication nodes using transmission beams through the plurality of antenna panels based on the configured parameter.

14 Claims, 24 Drawing Sheets

(56) References Cited

U.S. PATENT DOCUMENTS

| | | |
|---|---|---|
| 9,496,929 B2 | 11/2016 | Chae et al. |
| 9,516,525 B2 | 12/2016 | Jeong et al. |
| 9,577,734 B2 | 2/2017 | Le Bars et al. |
| 9,635,627 B2 | 4/2017 | Krishnamoorthy |
| 9,680,536 B2 | 6/2017 | Song et al. |
| 9,680,546 B2 | 6/2017 | Trainin |
| 2013/0286960 A1 | 10/2013 | Li et al. |
| 2014/0162655 A1* | 6/2014 | Hong .................. H01Q 21/061 455/436 |
| 2014/0269581 A1* | 9/2014 | Song .................... H04B 7/0632 370/329 |
| 2015/0341092 A1 | 11/2015 | Park et al. |
| 2016/0174244 A1 | 6/2016 | Kim et al. |

\* cited by examiner (a)　　　　　(b)　　　　　(c)

FIG. 20
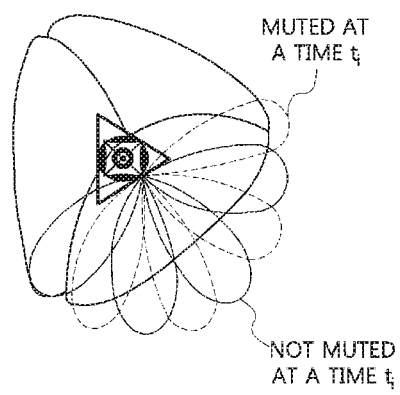
(a)
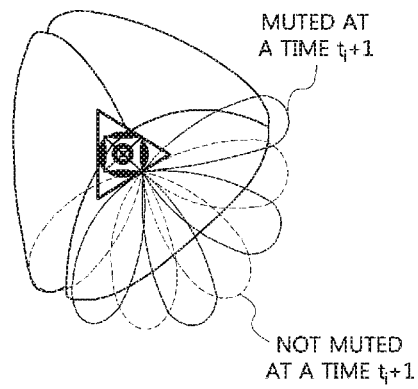
(b)

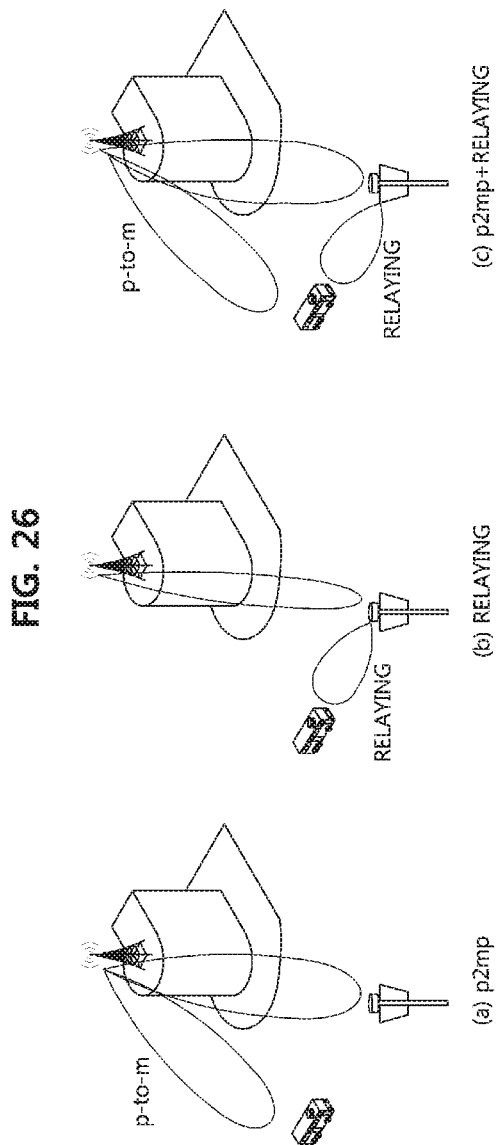

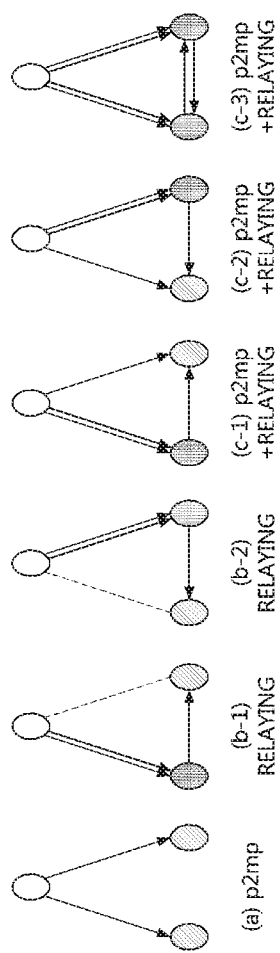

METHOD FOR SUPPORTING BEAMFORMING IN COMMUNICATION NETWORK

CROSS-REFERENCE TO RELATED APPLICATIONS

This application claims priorities to Korean Patent Applications No. 10-2017-0010727 filed on Jan. 23, 2017 and No. 10-2018-0006943 filed on Jan. 19, 2018 in the Korean Intellectual Property Office (KIPO), the entire contents of which are hereby incorporated by reference.

BACKGROUND

1. Technical Field

The present disclosure relates to a method and an apparatus for supporting beamforming in a communication network, and more specifically, to a method and an apparatus for performing communications through multi-antenna based beamforming in a communication network.

2. Related Art

In a mobile communication system, a terminal (e.g., user equipment (UE)) may transmit and receive data units through a base station. For example, if there is a data unit to be transmitted to a second terminal, a first terminal may generate a message including the data unit to be transmitted to the second terminal, and transmit the generated message to a first base station. The first base station may then receive the message from the first terminal and confirm that a destination of the received message is the second terminal. The first base station may transmit the message to a second base station to which the second terminal, which is the confirmed destination, is connected. The second base station may then receive the message from the first base station and confirm that the destination of the received message is the second terminal. The second base station may transmit the message to the second terminal, which is the confirmed destination. The second terminal may receive the message from the second base station and obtain the data unit included in the received message.

Meanwhile, as the number of mobile Internet users using a communication network increases, various mobile communication providers are searching for an efficient method for enhancing services provided through the communication network. In particular, various problems to be solved for enhancing services provided through the communication network include a method for reducing delay of data transmission, a method for providing and improving reliability through data transmission and retransmission, a method for providing a flexible and scalable service in consideration of characteristics of user terminals and characteristics of the service, a method for providing a service to which frequency characteristics and frequency operation regulations are reflected, a method for providing data of high speed (or, high capacity) according to user requirements, and the like.

SUMMARY

Accordingly, embodiments of the present disclosure provide a method and an apparatus for performing communications through beamforming based on multiple antennas in a communication network.

In order to achieve the objective of the present disclosure, a multi-antenna performing beamforming in a communication network may comprise a plurality of antenna panels including a plurality of antenna elements radiating signals for the beamforming; and a plurality of beamformers including the plurality of antenna panels. The plurality of beamformers may be formed so as to be steered to different directions as included in a top portion, a middle portion, and a bottom portion of the multi-antenna.

The plurality of beamformers may be mapped to a plurality of sectors configuring a data service area which is a beam area formed by the beamforming of the multi-antenna.

The plurality of beamformers may include a plurality of horizontal beamformers formed so as to be steered to horizontally-different directions with the multi-antenna centered.

The plurality of beamformers may include a plurality of vertical beamformers formed so as to be steered to vertically-different directions with the multi-antenna centered.

The plurality of antenna panels may be formed so as to have a predetermined same separation distance between adjacent antenna panels in a region of a beamformer in which the plurality of antenna panels is included.

In each of the plurality of antenna panels, at least one radio frequency (RF) chain may be connected to a plurality of antenna elements included in each of the plurality of antenna panels.

In order achieve the objective of the present disclosure, an operation method performed in a multi-antenna performing beamforming in a communication network may comprise selecting a beamformer generating a transmission beam for transmitting data to a plurality of communication nodes included in the communication network among a plurality of beamformers included in the multi-antenna; selecting at least one antenna panel corresponding to each of the plurality of communication nodes among a plurality of antenna panels included in the selected beamformer; configuring a parameter for respectively allocating an independent transmission beams to each of the plurality of communication nodes based on the selected at least one antenna panel; and transmitting data to the plurality of communication nodes using transmission beams through the plurality of antenna panels based on the configured parameter.

The parameter may be one of a sequence of respectively transmitting data to the plurality of communication nodes through the transmission beams, a beam index and a beam width of a transmission beam for transmitting data to each of the plurality of communication nodes.

In the transmitting data to the plurality of communication nodes, when the parameter is the sequence of respectively transmitting data to the plurality of communication nodes through the transmission beams, the data may be sequentially transmitted to the plurality of communication nodes through the transmission beams according to the sequence of respectively transmitting data.

The beam index and the beam width may be configured differently according to service types supported by the plurality of communication nodes and types of the plurality of communication nodes.

In the transmitting data to the plurality of communication nodes, when the parameter is the beam index, the data may be transmitted to each of the plurality of communication nodes through a transmission beam having a beam index configured differently according to the service types supported by the plurality of communication nodes and the types of the plurality of communication nodes.

In the transmitting data to the plurality of communication nodes, when the parameter is the beam width, the data may be transmitted to each of the plurality of communication nodes through a transmission beam having a beam width configured differently according to the service types supported by the plurality of communication nodes and the types of the plurality of communication nodes.

In the transmitting data to the plurality of communication nodes, the data may be transmitted to the plurality of communication nodes through transmission beams generated by a plurality of antenna elements included in the at least one antenna panel.

In order to achieve the objective of the present disclosure, a communication node including a multi-antenna performing beamforming in a communication network may comprise a processor and a memory storing at least one instruction executed by the processor. The at least one instruction may be configured to select a beamformer generating a transmission beam for transmitting data to a plurality of communication nodes included in the communication network among a plurality of beamformers included in the multi-antenna; select at least one antenna panel corresponding to each of the plurality of communication nodes among a plurality of antenna panels included in the selected beamformer; configure a parameter for respectively allocating independent transmission beams to the plurality of communication nodes based on the selected at least one antenna panel; and transmit data to the plurality of communication nodes using transmission beams through the plurality of antenna panels based on the configured parameter.

The parameter may be one of a sequence of respectively transmitting data to the plurality of communication nodes through the transmission beams, a beam index and a beam width of a transmission beam for transmitting data to each of the plurality of communication nodes.

When the parameter is the sequence of respectively transmitting data to the plurality of communication nodes through the transmission beams in the transmitting data to the plurality of communication nodes, the at least one instruction may be further configured to sequentially transmit the data to the plurality of communication nodes through the transmission beams according to the sequence of respectively transmitting data.

The beam index and the beam width may be configured differently according to service types supported by the plurality of communication nodes and types of the plurality of communication nodes.

When the parameter is the beam index in the transmitting data to the plurality of communication nodes, the at least one instruction may be further configured to transmit the data to each of the plurality of communication nodes through a transmission beam having a beam index configured differently according to the service types supported by the plurality of communication nodes and the types of the plurality of communication nodes.

When the parameter is the beam width in the transmitting data to the plurality of communication nodes, the at least one instruction may be further configured to transmit the data to each of the plurality of communication nodes through a transmission beam having a beam width configured differently according to the service types supported by the plurality of communication nodes and the types of the plurality of communication nodes.

In the transmitting data to the plurality of communication nodes, the at least one instruction may be further configured to transmit the data to the plurality of communication nodes through transmission beams generated by a plurality of antenna elements included in the at least one antenna panel.

According to the embodiments of the present disclosure, it is made possible to provide an enhanced service based on multiple antennas in a communication network, and effectively use radio resources available in the communication network.

BRIEF DESCRIPTION OF DRAWINGS

Embodiments of the present disclosure will become more apparent by describing in detail embodiments of the present disclosure with reference to the accompanying drawings, in which:

FIG. 20 is a conceptual diagram illustrating a muting based beam allocation performed in a multi-antenna of a communication network according to another embodiment of the present disclosure;

FIG. 26 is a conceptual diagram illustrating a method of providing a beamforming-based service in a communication network according to another embodiment of the present disclosure; and FIG. 27 is a conceptual diagram illustrating a beamforming-based service topology in a communication network according to another embodiment of the present disclosure.

DETAILED DESCRIPTION

Figure 1:
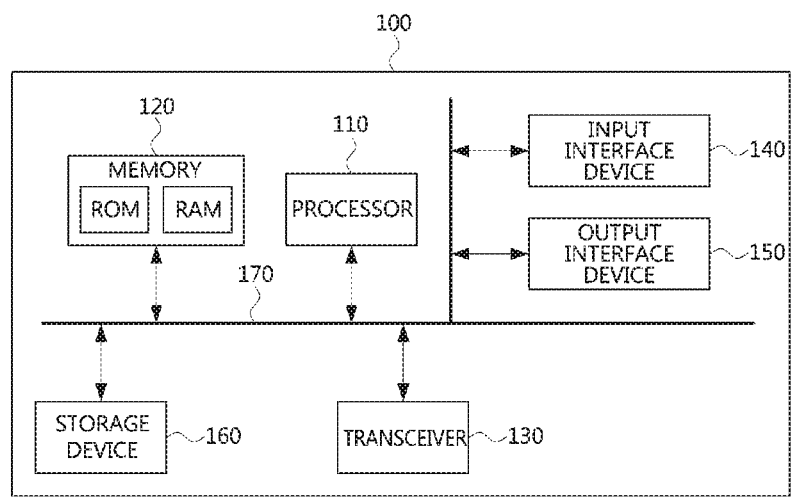
FIG. 1 is a block diagram illustrating an apparatus performing communications based on multiple antennas in a communication network according to an embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a block diagram illustrating an apparatus performing communications based on multiple antennas in a communication network according to an embodiment of the present disclosure.

Referring to FIG. 1, an apparatus 100 performing communications based on multiple antennas in a communication network according to an embodiment of the present disclosure may comprise at least one processor 110, a memory 120, and a transceiver 130 connected to a network for performing communications. Also, the apparatus 100 may further comprise an input interface device 140, an output interface device 150, a storage device 160, and the like. Each component included in the apparatus 100 may communicate with each other as connected through a bus 170. However, each of the components included in the apparatus 100 may be connected to the processor 110 via a separate interface or a separate bus rather than the common bus 170. For example, the processor 110 may be connected to at least one of the memory 120, the transceiver 130, the input interface device 140, the output interface device 150, and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM).

The methods according to the present disclosure, which are described in the present disclosure, may be performed by a communication node having a structure similar to or same as the structure of the apparatus 100 described with reference to FIG. 1. That is, methods for performing communications based on multiple antennas in a communication network according to the present disclosure may be performed in the apparatus 100 described with reference to FIG. 1, specifically, through a program code executed by the processor 110 included in the apparatus 100.

The apparatus for providing enhanced services using a radio resource in the communication network according to the present disclosure may include an enhanced mobile broadband (eMBB) based apparatus requiring high capacity data transmission, a low latency (LL) based apparatus requiring low transmission latency, a coverage enhanced (CE) based apparatus requiring improved transmission distances, and a low complexity (LC) based apparatus requiring enhanced complexity.

In the communication network according to the present disclosure, the apparatus performing communications based on multiple antennas may be referred to as an 'S-device' for providing enhanced services, and may be applied to the eMBB based apparatus, the LL-based apparatus, and the CE-based apparatus. Also, the apparatus performing communications based on multiple antennas may perform functions such as those of a transmission apparatus, a reception apparatus, and a relay apparatus for providing enhanced services. In the communication network according to the present disclosure, a downlink (DL) may mean transmission from a base station to a terminal, and an uplink (UL) may mean transmission from the terminal to the base station.

There may be various methods for providing enhanced services in such the communication network. For example, the methods for providing enhanced services may include a method of improving a transmission rate, a method of improving a spectral efficiency, a method of providing a system bandwidth suited to service requirements, a method of providing a connection suited to service requirements, a method of retransmission for enhanced reliability and a method of preventing retransmission through enhanced transmission, a method of providing wide coverage, and a transmission method to which operation frequency characteristics are reflected. Hereinafter, the plurality of methods described as examples of the methods for providing enhanced services in the communication network will be specifically described.

First, the method of improving the transmission rate among the methods for providing enhanced services in the communication network may mean a method of improving a transmission rate by improving a performance of signal processing. Here, in case that there are regulations on frequency operations according to spectral uses in the communication network, a service may be provided within a range satisfying the regulations. For example, in the communications network, the transmission rate may be improved by applying a high performance signal processing technique (e.g., a high-order modulation and coding scheme (MCS), for example, 1024 QAM).

However, in the communication network, a wireless signal may be lost due to an environment such as a free space loss, a rainfall, an atmosphere, and the like. Particularly, in case of a microwave having a frequency of about 6 GHz or a millimeter wave having a frequency of 6 GHz or more, a wireless signal may be greatly affected by the environment. Therefore, in order to apply the high-order MCS in a millimeter-wave based communication network, adaptive MCS should be applied according to the environment. For example, the millimeter-wave based communication network may be configured to configure and operate a link adaptation technique and a maximum MCS based on availability (e.g., 99.5%, 99.9%, 99.95%, 99.995%, 99.999%, etc.) due to a rainfall.

Also, the millimeter-wave based communication network may provide services based on a combination of two or more wireless links, similar to a carrier aggregation using two or more component carriers at the same time. For example, the millimeter-wave based communication network, when a transmission quality of a single wireless link is deteriorated depending on characteristics of the wireless link, may be configured to perform communications based on an additional wireless link by combining high-frequency and low-frequency.

Meanwhile, among the methods for providing enhanced services in the communication network, the method of improving the spectral efficiency may mean a method of improving the spectral efficiency based on multiplexing. The multiplexing may be performed through a plurality of layers and links, which may be provided based on multiple antennas and multiple transmission points. The multiple antennas may require an operation frequency, and proper arrangement and spacing to form multiple layers and links. Also, rapid and accurate control and cooperation between multiple transmission points may be required.

Also, among the methods for providing enhanced services in the communication network, the method of providing a system bandwidth suited to service requirements may require a relatively wide system bandwidth in order to provide high data capacity. The system bandwidth may be broadened by broadening a spectrum or by combining two or more wireless links. Even though a conventional wireless communication system is designed as a specific system using a frequency band of 6 GHz or less, two or more systems may co-exist in a license-exempt band or a public frequency band (e.g., 5 GHz or mmWave) as conforming frequency operation regulations. In particular, the license-exempt band or public frequency band has an advantage of providing a relatively wide spectrum, and it is possible to provide high-capacity data through the relatively wide system bandwidth. In this case, the maximum system bandwidth may be limited to a predetermined bandwidth (e.g., 1 or 2 GHz) due to hardware limitations, and the system bandwidth may be further divided (e.g., channelization) due to coexistence with another system or other devices of the same system.

Further, among the methods for providing enhanced services in the communication network, according to the method of providing a connection suited to service requirements, the wireless communication system may require not point-to-point communication services but point-to-multi-point communication (or, multiple access) services. Also, the wireless communication system may be required to provide more connections through limited radio resources.

Further, among the methods for providing enhanced services in the communication network, according to the method of enhancing a reliability, wireless communication may have a case when data transmission fails or a case when a data transmission error occurs, which can be overcome by reliable transmission, correction of the data transmission errors, and retransmission on a transmitting device side. At this time, in the communication network, the transmitting apparatus may determine whether the data transmission is successful or not through feedback (or an acknowledgment) transmitted from the receiving apparatus that receives the data. Also, in the communication network, the transmitting apparatus may enhance the reliability by retransmitting the same data without feedback of the receiving apparatus, or by performing the data transmission through two or more links or transmission points.

Further, among the methods for providing enhanced services in the communication network, according to the method of providing wide coverage, the communication network may control the transmitting apparatus to transmit a high power signal or control the receiving apparatus to receive a signal with a power lowered due to signal attenuation so that the enhanced service can be provided even in a case of poor channel quality or even for the receiving apparatus located far from the transmitting apparatus. The method of providing wide coverage may overcome restriction of a signal propagation distance through relaying based on multi-hop transmissions. Also, the method of providing wide coverage in the communication network may spatially divide signals instead of transmitting signals in all directions, thereby extending coverage by strongly radiating signals in a specific direction. Here, the communication network may apply and operate a technique of forming a beam or removing interference by using a directional antenna or arranging a plurality of antennas.

Figure 2:
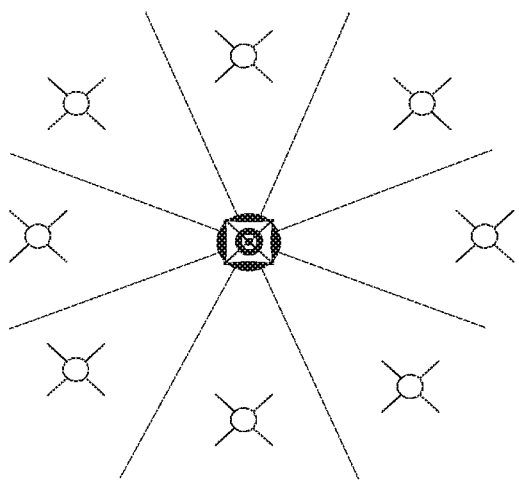
FIG. 2 is a conceptual diagram illustrating a beamforming space through multiple antennas in a communication network according to an embodiment of the present disclosure.
Figure 3:
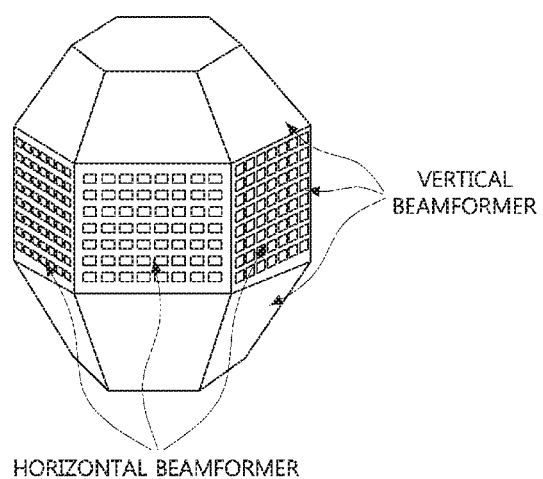
FIG. 3 is a conceptual diagram illustrating multiple antennas supporting beamforming in a communication network according to an embodiment of the present disclosure.
Figure 4:
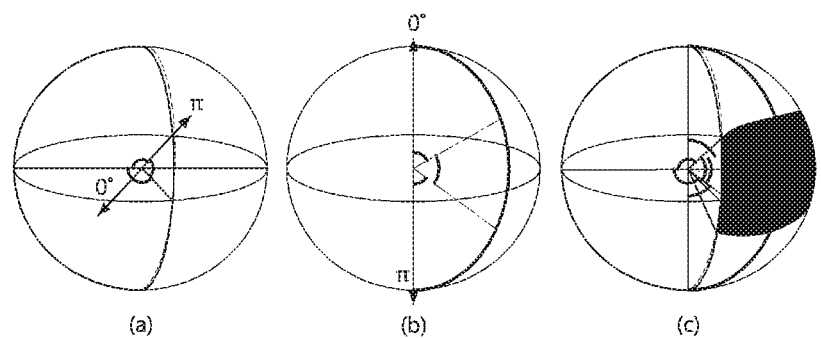
FIG. 4 is a conceptual diagram illustrating a sector corresponding to a beamformer of multiple antennas supporting beamforming in a communication network according to an embodiment of the present disclosure.

FIG. 2 is a conceptual diagram illustrating a beamforming space through multiple antennas in a communication network according to an embodiment of the present disclosure, FIG. 3 is a conceptual diagram illustrating multiple antennas supporting beamforming in a communication network according to an embodiment of the present disclosure, and FIG. 4 is a conceptual diagram illustrating a sector corresponding to a beamformer of multiple antennas supporting beamforming in a communication network according to an embodiment of the present disclosure.

Referring to FIG. 2, in the communication network according to an embodiment of the present disclosure, a communication node may perform beamforming using multiple antennas (hereinafter, referred to as 'multi-antenna'). In following embodiments, operations performed by the multi-antenna may mean operations performed by a communication node including the multi-antenna. For example, the beamforming may mean forming a beam through a directional antenna that strongly radiates a signal in a particular direction, or forming a beam by appropriately controlling arrangement of a plurality of antennas and beam emissions of the plurality of antennas. The multi-antenna according to an embodiment of the present disclosure may perform beamforming for a specific direction by strongly radiating a signal in the specific direction.

Specifically, as shown in FIG. 2, the multi-antenna according to an embodiment of the present disclosure may perform beamforming by spatially dividing directions in which signals are radiated, and perform beamforming for each spatially-divided space. The structure of the multi-antenna performing the beamforming in this manner will be described in detail with reference to FIG. 3 below.

Referring to FIG. 3, the multi-antenna according to an embodiment of the present disclosure may comprise a plurality of antenna panels each of which includes a plurality of antenna elements that emits signals for beamforming, and a plurality of beamformers each of which includes the plurality of antenna panels. Here, the plurality of beamformers may be formed so as to face different directions as included in a top portion, a middle portion, and a bottom portion of the multi-antenna.

Here, the plurality of beamformers may refer to a plurality of sectors constituting a data service area, which is a beam area formed through beamforming of the multi-antenna. That is, each of the plurality of beamformers included in the multi-antenna may be mapped to each of the plurality of sectors constituting the data service area according beams formed through the beamforming of the multi-antenna. Accordingly, a beamformer described below may be used interchangeably with a sector. Also, the plurality of beamformers included in the multi-antenna may include a plurality of horizontal beamformers and a plurality of vertical beamformers. Here, the plurality of horizontal beamformers may mean beamformers formed so as to be steered to horizontally-different directions in the multi-antenna. Also, the plurality of vertical beamformers may mean beamformers formed so as to be steered to vertically-different directions in the multi-antenna.

For example, in the multi-antenna according to an embodiment of the present disclosure, the plurality of horizontal beamformers may perform data transmission and reception with a communication node located at a height equal to or similar to the height of the multi-antenna, and the number of the plurality of horizontal beamformers may be assumed to be $N_h$. Also, in the multi-antenna according to an embodiment of the present disclosure, the plurality of vertical beamformers may perform data transmission and reception with a communication node (e.g., base station, relay, street lamp, etc.) located at a height different from the height of the multi-antenna or a moving communication node (e.g., bus, train, drone, user terminal, etc.), and the number of the plurality of vertical beamformers may be assumed to be $N_v$.

In this circumstance, in case that a service area where a service is provided based on the beamforming of the multi-antenna is assumed to be spherical, the service area based on the beamforming of the multi-antenna may be constituted by at least one sector among horizontal sectors corresponding to the plurality of horizontal beamformers and vertical sectors corresponding to the plurality of vertical beamformers.

Specifically, when the service area based on the beamforming of the multi-antenna is configured as horizontal sectors corresponding to the plurality of horizontal beamformers, one horizontal sector may have a horizontal angle of $$\frac{2\pi}{N_h}$$

(which can be converted to an angle corresponding to a zenith angle or a nadir angle). For example, based on a reference point 0°, the horizontal sectors may be distinguished based on coordinates such as $$\left[-\frac{2\pi}{2N_h}\left(=2\pi-\frac{2\pi}{2N_h}\right),+\frac{2\pi}{2N_h}\right], \left[\frac{2\pi}{N_h}-\frac{2\pi}{2N_h},\right.$$
$$\left.\frac{2\pi}{N_h}+\frac{2\pi}{2N_h}\right], \ldots \left[\frac{(N_h-1)2\pi}{N_h}-\frac{2\pi}{2N_h},\frac{(N_h-1)2\pi}{N_h}+\frac{2\pi}{2N_h}\right].$$

Also, when the service area based on the beamforming of the multi-antenna is configured as vertical (or, elevation) sectors corresponding to the plurality of vertical beamformers, one vertical sector may have a vertical angle $$\frac{2\pi}{N_v}$$

(which can be converted to an angle corresponding to an azimuth angle). For example, based on a reference point 0°, the vertical sectors may be distinguished based on coordinates such as $$\left[0,\frac{\pi}{N_v}\right], \left[\frac{\pi}{N_v},\frac{2\pi}{N_v}\right], \ldots \left[\frac{(N_v-1)\pi}{N_v},\pi\right].$$

In this regard, (a) of FIG. 4 illustrates a case where the service area based on the beamforming of the multi-antenna is composed of three horizontal sectors. Also, (b) of FIG. 4 illustrates a case where the service area based on the beamforming of the multi-antenna is composed of three vertical sectors. Also, (c) of FIG. 4 illustrates a case where the service area based on the beamforming of the multi-antennas is composed of three horizontal sectors and three vertical sectors. That is, (c) of FIG. 4 illustrates a case where the service area based on the beamforming of the multi-antenna is divided into nine sectors.

As described above, in the case where the service area is configured by each of the plurality of beamformers (i.e., the plurality of sectors) included in the multi-antenna, the service area to which a service is provided by each of the plurality of beamformers may be configured as an area to which a service is provided by an antenna panel (i.e., a service area of a beamformer=a service area of an antenna panel) or an area to which a service is provided by each of a plurality of antenna panels (i.e., a service area of a beamformer/a service area of an antenna panel).

Meanwhile, the plurality of beamformers included in the multi-antenna, the plurality of antenna panels included in each of the plurality of beamformers, and the plurality of antenna elements included in each of the plurality of antenna panels according to the embodiment of the present disclosure described with reference to FIG. 3 will be described in detail below with reference to FIGS. 5 and 6.

Figure 5:
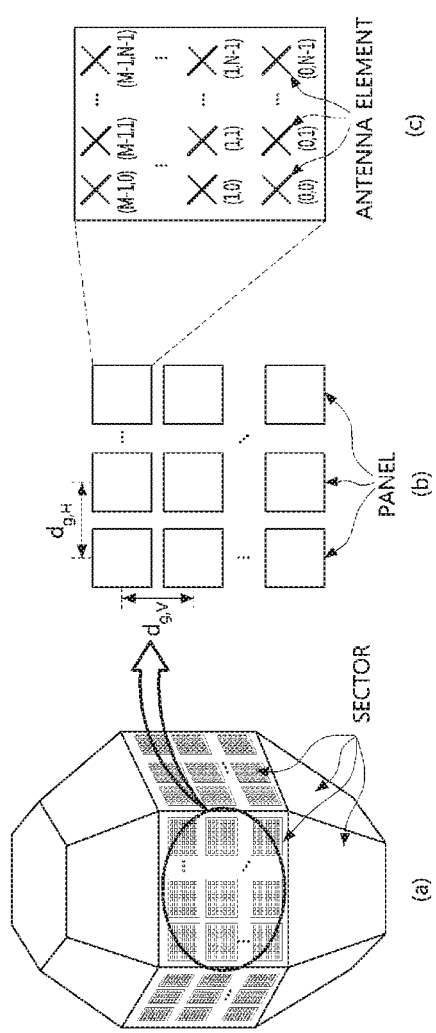
FIG. 5 is a conceptual diagram illustrating a structure of a multi-antenna supporting beamforming in a communication network according to an embodiment of the present disclosure.

FIG. 5 is a conceptual diagram illustrating a structure of a multi-antenna supporting beamforming in a communication network according to an embodiment of the present disclosure.

Referring to FIG. 5, a structure of a multi-antenna supporting beamforming in a communication network according to an embodiment of the present disclosure may be identified. Specifically, referring to (a) of FIG. 5, the multi-antenna may comprise a plurality of sectors (which may mean a plurality of beamformers) at the top portion, middle portion, and bottom portion. For example, the plurality of sectors included in the middle portion of the multi-antenna shown in (a) of FIG. 5 may mean the horizontal sectors described with reference to FIG. 4. Also, referring to (b) of FIG. 5, each of the plurality of sectors included in the multi-antenna may include a plurality of antenna panels. Here, the plurality of antenna panels included in each of the plurality of sectors of the multi-antenna may be formed to have the same predetermined distance from the adjacent antenna panel in a region of the beamformer including the plurality of antenna panels.

For example, one beam sector of the plurality of beam sectors included in the multi-antenna may include $N_{t_h}^c$ horizontally-positioned antenna panels and $N_{t_v}^c$ vertically-positioned antenna panels. That is, one beam sector of the plurality of beam sectors included in the multi-antenna may include a total of $N_t^c(=N_{t_h}^c N_{t_v}^c)$ antenna panels. Here, in each of the plurality of antenna panels, at least one RF chain may be connected to the plurality of antenna elements. Also, the plurality of antenna panels may be spaced in a horizontal separation distance $d_{g,H}$ and a vertical separation distance $d_{g,V}$.

Also, referring to (c) of FIG. 5, the plurality of antenna elements included in each of the plurality of antenna panels of the multi-antenna may include $N_{t_h}^a$ horizontally-positioned antenna elements and $N_{t_v}^a$ vertically-positioned antenna elements. That is, one of the plurality of antenna panels included in the multi-antenna may include a total of $N_t^a(=N_{t_h}^a N_{t_v}^a)$ antenna elements. Here, the plurality of antenna elements may be spaced in a horizontal separation distance $d_{t_h}$ and a vertical separation distance $d_{t_v}$. In this case, each of the plurality of antenna panels may be down-tilted and up-tilted by a maximum $\theta_{max}$ (e.g., 102°), and may be horizontally-tilted by as much as $\varphi_{max}$.

Hereinafter, a radiation pattern of the antenna elements included in the antenna panel of the multi-antenna supporting beamforming in a communication network according to an embodiment of the present disclosure will be described. A beam pattern may be defined for a service area based on the beamforming of the multi-antenna in the communication network. Here, a beam width may be described as a half power beam width having a half intensity as compared with a main lobe when a beam is radiated. The radiation pattern of the multi-antenna according to an embodiment of the present disclosure may be generated based on Table 1 below.

TABLE 1

| Parameter | Values |
|---|---|
| Antenna element vertical radiation pattern (dB) | $A_{E,V}(\theta'') = -\min\left\{12\left(\frac{\theta''-90°}{\theta_{3dB}}\right)^2, SLA_V\right\}, \theta_{3dB} = 65°, SLA_V = 30$ dB |
| Antenna element horizontal radiation pattern (dB) | $A_{E,H}(\varphi'') = -\min\left\{12\left(\frac{\varphi''}{\varphi_{3dB}}\right)^2, A_m\right\}, \varphi_{3dB} = 65°, A_m = 30$ dB |
| Combining method for | $A''(\theta'', \varphi'') = -\min\{-[A_{E,H}(\varphi'') + A_{E,V}(\theta'')], A_m\}$ |

TABLE 1-continued

| Parameter | Values |
| --- | --- |
| 3D antenna element pattern (dB) | |
| Maximum directional gain of an antenna element $G_{E,max}$ | 8 dBi |
| Equation of magnitude of element patterns | $20 \times \log_{10}(P_E(\theta, \varphi)) = G_{E,Max} + A''(\theta'', \varphi'')$ |
| Composite Array radiation pattern in dB $A_A(\theta, \varphi)$ | $A_A(\theta, \varphi) = A_E(\theta, \varphi) + 10 \log_{10}\left[1 + \rho \cdot \left(\left|\sum_{m=1}^{N_{t_h}^a} \sum_{n=1}^{N_{t_v}^a} f_{m,n}^a \cdot f_{m,n}^d\right|^2 - 1\right)\right]$ | the steering matrix components are given by $$f_{m,n}^a = e^{j\frac{2\pi}{\lambda}\{(n-1)d_{t_v}\cos\theta_i^a + (m-1)d_{t_h}\sin\theta_i^a\sin\varphi_i^a\}}$$

$$m = 1, 2, \ldots, N_{t_h}^a$$

$$n = 1, 2, \ldots, N_{t_v}^a$$

the weighting factor (if electrical tilting is applied) is given by $$f_{m,n}^d = \frac{1}{\sqrt{N_{t_h}^a N_{t_v}^a}} e^{j\frac{2\pi}{\lambda}\{(n-1)d_{t_v}\sin\theta_i^e - (m-1)d_{t_h}\cos\theta_i^e\sin\varphi_i^e\}}$$

$$m = 1, 2, \ldots, N_{t_h}^a$$

$$n = 1, 2, \ldots, N_{t_v}^a$$

Figure 6:
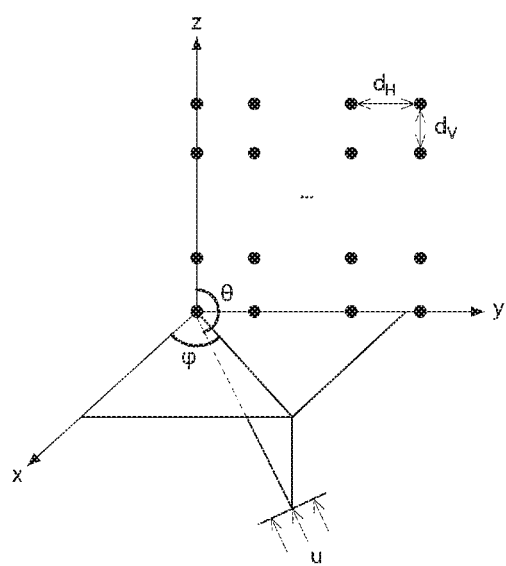
FIG. 6 is a conceptual diagram illustrating a geometric distribution of a multi-antenna supporting beamforming in a communication network according to an embodiment of the present disclosure.

FIG. 6 is a conceptual diagram illustrating a geometric distribution of a multi-antenna supporting beamforming in a communication network according to an embodiment of the present disclosure.

Referring to FIG. 6, the antenna elements included in the antenna panel of the multi-antenna according to an embodiment of the present disclosure may be formed based on a two-dimensional uniform rectangular array (2D URA) scheme. In further detail, referring to the geometric distribution of the antenna elements included in the multi-antenna according to an embodiment of the present disclosure, the y-axis may represent $N_{t_h}^a$ horizontally-positioned antenna elements and the x-axis may represent $N_{t_v}^a$ vertically-positioned antenna elements.

In this case, the antenna elements according to an embodiment of the present disclosure may apply an antenna array factor $\bar{F}$ based on the arrangement scheme of the antenna elements. Specifically, the 2D URA antenna elements may apply a phase shift to an adaptive beamforming (ABF) based on Equation 1 below.

$$F_A^i = \left[f_{1,1}^a(\varphi_i^a, \theta_i^a), f_{1,2}^a(\varphi_i^a, \theta_i^a), \ldots, f_{1,N_{t_v}^a}^a(\varphi_i^a, \theta_i^a), \ldots,\right.$$ [Equation 1]

$$\left. f_{m,n}^a(\varphi_i^a, \theta_i^a), \ldots, f_{N_{t_h}^a,1}^a(\varphi_i^a, \theta_i^a), \ldots, f_{N_{t_h}^a,N_{t_v}^a}^a(\varphi_i^a, \theta_i^a)\right]^T,$$

$$f_{m,n}^a(\varphi_i^a, \theta_i^a) = e^{j\frac{2\pi}{\lambda}\{(n-1)d_{t_v}\cos\theta_i^a + (m-1)d_{t_h}\sin\theta_i^a\sin\varphi_i^a\}},$$

where m=1, 2, . . . , $N_{t_h}^a$, n=1, 2, . . . , $N_{t_v}^a$.

Here, the antenna panels or the antenna elements of the multi-antenna may be maximally steered by 0<φ, $$\theta \le \frac{\pi}{2}$$

in maximum horizontal and vertical directions with respect to a boresight, respectively. Also, the antenna panels or the antenna elements of the multi-antenna may consider an electrical tilting, unlike a change in the boresight based on the angle at which the tilting is performed in the case of performing a mechanical tilting. In this case, Equation 2 below may be applied in a baseband of the multi-antenna. In Equation 2, $\varphi_{e,i}$ may mean an electrical horizontal tilting angle, and $\theta_{e,i}$ may be an electrical down tilting angle.

$$F_E^i = \left[f_{1,1}^e(\varphi_i^e, \theta_i^e), \ldots, f_{1,N_{t_v}^a}^e(\varphi_i^e, \theta_i^e), \ldots, f_{m,n}^e(\varphi_i^e, \theta_i^e),\right.$$ [Equation 2]

$$\left. \ldots, f_{N_{t_h}^a,1}^e(\varphi_i^e, \theta_i^e), \ldots, f_{N_{t_h}^a,N_{t_v}^a}^e(\varphi_i^e, \theta_i^e)\right]^T,$$

$$f_{m,n}^e(\varphi_i^e, \theta_i^e) = \frac{1}{\sqrt{N_{t_h}^a N_{t_v}^a}} e^{j\frac{2\pi}{\lambda}\{(n-1)d_{t_v}\sin\theta_i^e - (m-1)d_{t_h}\cos\theta_i^e\sin\varphi_i^e\}},$$

where m=1, 2, . . . , $N_{t_h}^a$, n=1, 2, . . . , $N_{t_v}^a$

Figure 7:
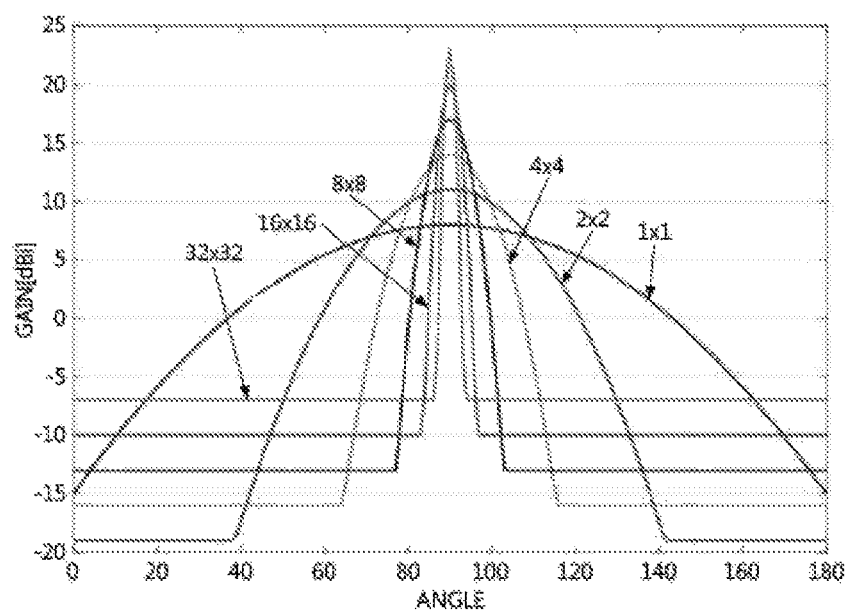
FIG. 7 is a graph illustrating gains and beam widths for beamforming of a multi-antenna supporting beamforming in a communication network according to an embodiment of the present disclosure.

FIG. 7 is a graph illustrating gains and beam widths for beamforming of a multi-antenna supporting beamforming in a communication network according to an embodiment of the present disclosure.

Referring to FIG. 7, the x-axis of the graph may represent an angle, and the y-axis of the graph may represent antenna gains.

The multi-antenna supporting beamforming in a communication network according to an embodiment of the present disclosure may perform antenna alignment and beamforming for a high data transmission rate. In this case, the multi-antenna according to an embodiment of the present disclosure can provide antenna gains as shown in the graph of FIG. 7, but beamforming through the multi-antenna has a relatively narrow beam width. Thus, beam patterning according to the beamforming, rapid discovery of communication nodes and beams, efficient alignment of directional antennas, and beam tracking for maintaining data transmission and reception may be required.

Hereinafter, a method for supporting beamforming in a communication network according to another embodiment of the present disclosure will be described in detail with reference to FIGS. 8 to 15.

Figure 8:
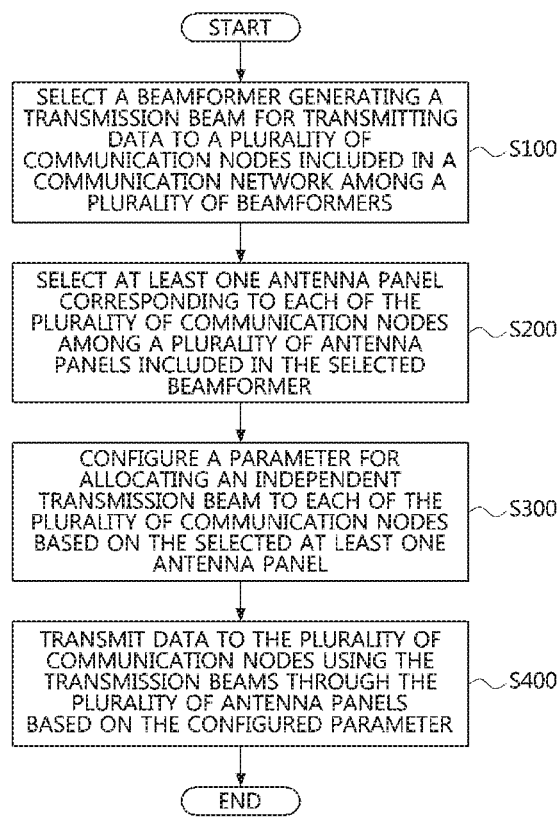
FIG. 8 is a flow chart illustrating a method of supporting beamforming in a communication network according to another embodiment of the present disclosure.

FIG. 8 is a flow chart illustrating a method of supporting beamforming in a communication network according to another embodiment of the present disclosure.

Referring to FIG. 8, a method of supporting beamforming according to another embodiment of the present disclosure may be performed by the apparatus performing communications based on multiple antennas in the communication network described with reference to FIG. 1. That is, the apparatus for supporting beamforming according to another embodiment of the present disclosure may refer to the multi-antenna described with reference to FIGS. 2 to 7.

First, the multi-antenna may select a beamformer that generate a transmission beam for transmitting data to a plurality of communication nodes included in the communication network among a plurality of beamformers included in the multi-antenna (S100). Here, the plurality of beamformers included in the multi-antenna may refer to the plurality of beamformers included in the top portion, middle portion, and bottom portion of the multi-antenna described with reference to FIGS. 3 and 5, and may include a plurality of antenna panels.

Then, the multi-antenna may select at least one antenna panel corresponding to each of the plurality of communication nodes among the plurality of antenna panels included in the selected beamformer (S200). That is, the multi-antenna may select at least one panel for transmitting data through a transmission beam for each of the plurality of communication nodes among the plurality of antenna panels included in the selected beamformer.

Then, the multi-antenna may configure a parameter for allocating an independent transmission beam to each of the plurality of communication nodes based on the selected at least one antenna panel (S300). Specifically, the parameter for allocating an independent transmission beam to each of the plurality of communication nodes may include at least one of a sequence of transmitting data to each of the plurality of communication nodes via each corresponding transmission beam, a beam index of each transmission beam through which data is transmitted to each of the plurality of communication nodes, and a beam width of each transmission beam.

Here, the beam index and the beam width may be configured differently according to a service type supported by each of the plurality of communication nodes and a type of each of the plurality of communication nodes. For example, the service type supported by each of the plurality of communication nodes may mean a communication method supported by each of the plurality of communication nodes. Also, the type of each of the plurality of communication nodes may mean a type related to mobility of each of the plurality of communication nodes, such as a fixed communication node having no mobility or a mobile communication node having mobility. Also, the type of each of the plurality of communication nodes may refer to a type related to each of the plurality of communication nodes, such as a base station or a user terminal.

Then, the communication node including the multi-antenna may transmit data to the plurality of communication nodes using the transmission beams through the plurality of antenna panels based on the configured parameter (S400). More specifically, when the parameter configured for allocating the independent transmission beam to each of the plurality of communication nodes is the sequence of transmitting data through the transmission beam to each of the plurality of communication nodes, the communication node including the multi-antenna may sequentially transmit data to the plurality of communication nodes through the transmission beams according to the sequence.

Also, when the parameter configured for allocating the independent transmission beam to each of the plurality of communication nodes is the beam index, the communication node including the multi-antenna may transmit data to each of the plurality of communication nodes through a transmission beam having the beam index configured differently according to one of the service type supported by each of the plurality of communication nodes and the type of each of the plurality of communication nodes.

Also, when the parameter configured for allocating the independent transmission beam to each of the plurality of communication nodes is the beam width, the communication node including the multi-antenna may transmit data to each of the plurality of communication nodes through a transmission beam having the beam width configured differently according to one of the service type supported by each of the plurality of communication nodes and the type of each of the plurality of communication nodes.

Through the above-described method, the communication node including the multi-antenna may allocate the transmission beam for transmitting data to each of the plurality of communication nodes based on the parameter configured for allocating independent transmission beams to the respective communication nodes, and may transmit data over the allocated transmission beams. Here, the communication node including the multi-antenna may transmit data through the transmission beams to the plurality of communication nodes through a plurality of antenna elements included in at least one antenna panel. Hereinafter, specific embodiments for the method of supporting beamforming in a communication network according to another embodiment of the present disclosure described with reference to FIG. 8 will be described with reference to FIGS. 9 to 15.

Figure 9:
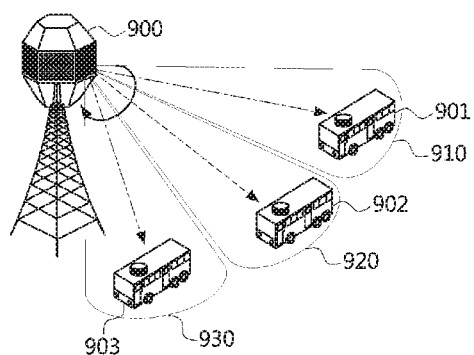
FIG. 9 is a conceptual diagram illustrating a first embodiment of a method for supporting beamforming in a multi-antenna of a communication network according to another embodiment of the present disclosure.
Figure 10:
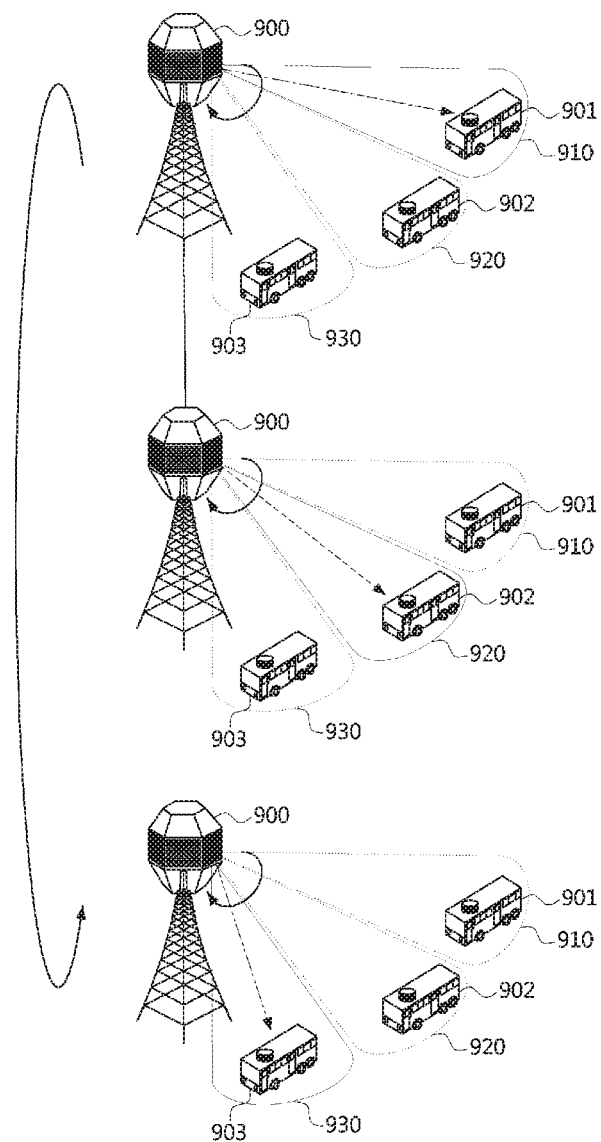
FIG. 10 is a conceptual diagram illustrating a second embodiment of a method for supporting beamforming in a multi-antenna of a communication network according to another embodiment of the present disclosure.
Figure 11:
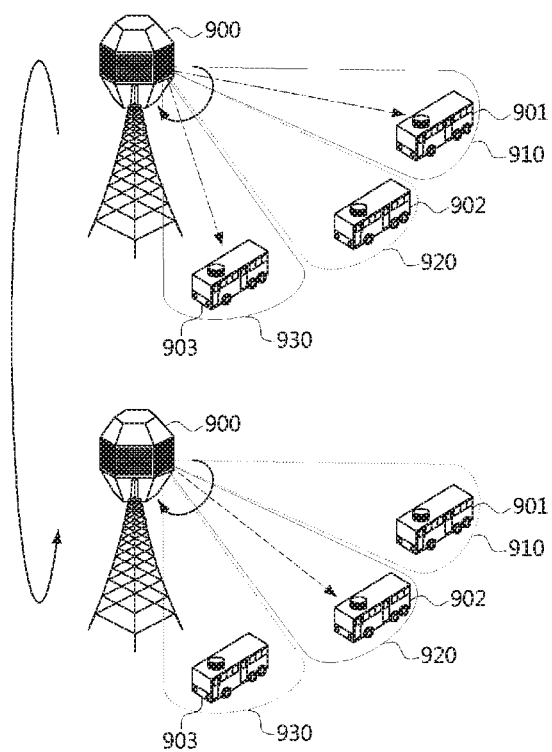
FIG. 11 is a conceptual diagram illustrating a third embodiment of a method of supporting beamforming in a multi-antenna of a communication network according to another embodiment of the present disclosure.

FIG. 9 is a conceptual diagram illustrating a first embodiment of a method for supporting beamforming in a multi-antenna of a communication network according to another embodiment of the present disclosure, FIG. 10 is a conceptual diagram illustrating a second embodiment of a method for supporting beamforming in a multi-antenna of a communication network according to another embodiment of the present disclosure, and FIG. 11 is a conceptual diagram illustrating a third embodiment of a method of supporting beamforming in a multi-antenna of a communication network according to another embodiment of the present disclosure.

Referring to FIGS. 9 to 11, a multi-antenna 900 (e.g., the communication node including the multi-antenna 900) according to another embodiment of the present disclosure may allocate an independent transmission beam to each of a plurality of communication nodes. Specifically, the plurality of communication nodes may include a first communication node 901, a second communication node 902, and a third communication node 903. The multi-antenna 900 (e.g., the communication node including the multi-antenna 900) may allocate a first transmission beam 910 to transmit data to the first communications node 901 and transmit the data to the first communication node 901 through the allocated first transmission beam 910. The multi-antenna 900 (e.g., the communication node including the multi-antenna 900) may also allocate a second transmit beam 920 to transmit data to the second communication node 902 and transmit the data to the second communication node 902 through the second transmission beam 920. The multi-antenna 900 (e.g., the communication node including the multi-antenna 900) may also allocate a third transmission beam 930 to transmit data to the third communication node 903 and transmit the data to the third communication node 903 through the third transmission beam 930.

In this case, the multi-antenna 900 (e.g., the communication node including the multi-antenna 900) may respectively allocate the independent transmission beams to the plurality of communication nodes, and configure parameters for transmitting data through the allocated transmission beams in advance. Specifically, the parameters configured in the multi-antenna 900 may include at least one of the sequence of transmitting data to each of the plurality of communication nodes via each corresponding transmission beam, the beam index of each transmission beam through which data is transmitted to each of the plurality of communication nodes, and the beam width of each transmission beam, as described with reference to FIG. 8.

Referring to FIG. 9, the communication node including the multi-antenna 900 according to another embodiment of the present disclosure may simultaneously transmit data to the plurality of communication nodes through the independent transmission beams each of which is configured for each of the plurality of communication nodes. That is, the communication node including the multi-antenna 900 may simultaneously transmit the data to the first communication node 901, the second communication node 902, and the third communication node 903 through the first transmission beam 910, the second transmission beam 920, and the third transmission beam 930.

Also, referring to FIG. 10, the communication node including the multi-antenna 900 according to another embodiment of the present disclosure may transmit the data to each of the plurality of communication nodes based on the configured parameter. In the case that the parameter configured for allocating the independent transmission beam to each of the plurality of communication nodes is the sequence of transmitting data through the transmission beam to each of the plurality of communication nodes, the communication node including the multi-antenna may sequentially transmit data to the plurality of communication nodes through the transmission beams according to the sequence.

For example, the communication node including the multi-antenna 900 may sequentially transmit data to the first communication node 901, the second communication node 902, and the third communication node 903 through each corresponding transmission beam in a sequence of the first communication node 901, the second communication node 902, and the third communication node 903. That is, the communication node including the multi-antenna 900 may transmit data to the first communication node 901 through the first transmission beam 910 allocated to the first communication node 901. Then, the communication node including the multi-antenna 900 may transmit data to the second communication node 902 through the second transmission beam 920 allocated to the second communication node 902. Then, the communication node including the multi-antenna 900 may transmit data to the third communication node 903 through the third transmission beam 930 allocated to the third communication node 903.

Also, referring to FIG. 11, the communication node including the multi-antenna 900 according to another embodiment of the present disclosure may transmit data to each of the plurality of communication nodes in a manner that data is not simultaneously transmitted through adjacent transmission beams among the transmission beams allocated to the plurality of communication nodes. For example, the communication node including the multi-antenna 900 may transmit data to the first communication node 901 and the third communication node 903 through the first transmission beam 910 allocated to the first communication node 901 and the third transmission beam 930 allocated to the third communication node 903. Thereafter, the communication node including the multi-antenna 900 may transmit data to the second communication node 902 through the second transmission beam 920 allocated to the second communication node 902.

Figure 12:
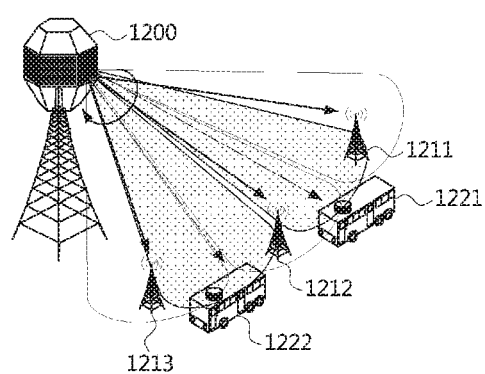
FIG. 12 is a conceptual diagram illustrating a fourth embodiment of a method for supporting beamforming in a multi-antenna of a communication network according to another embodiment of the present disclosure.
Figure 13:
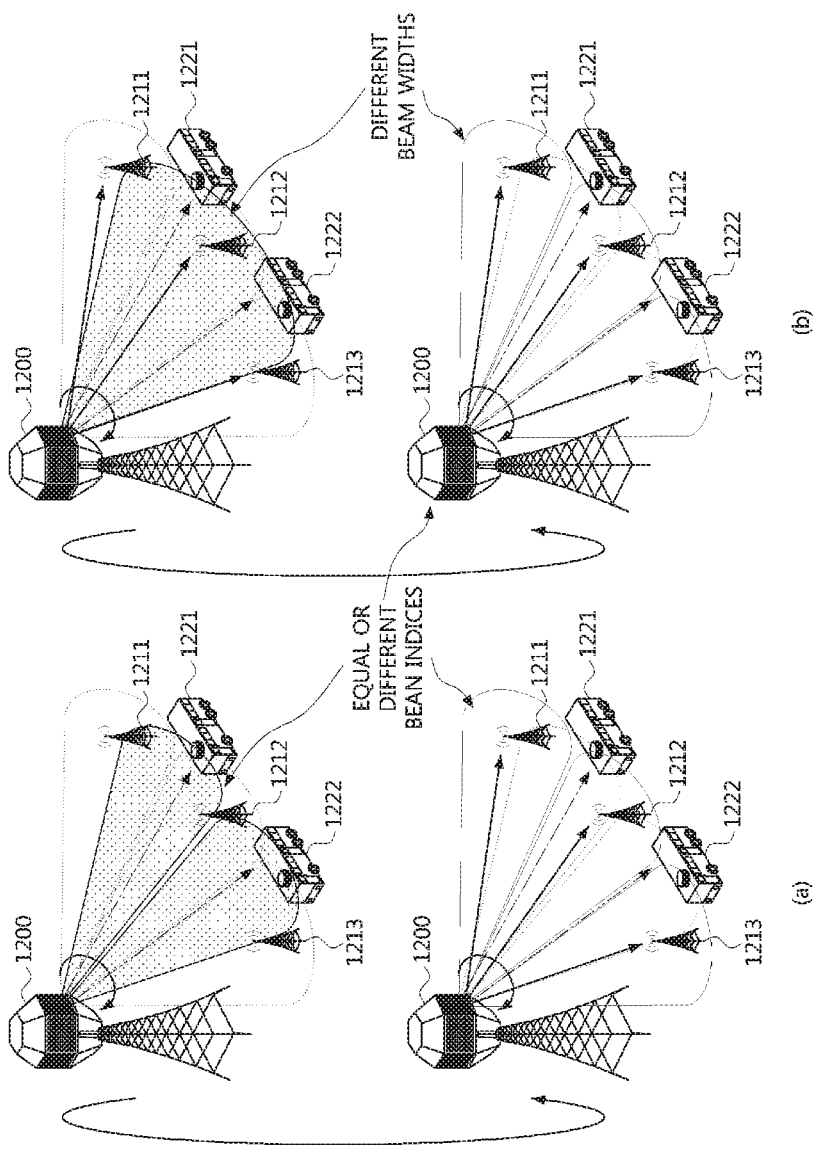
FIG. 13 is a conceptual diagram illustrating a fifth embodiment of a method for supporting beamforming in a multi-antenna of a communication network according to another embodiment of the present disclosure.

FIG. 12 is a conceptual diagram illustrating a fourth embodiment of a method for supporting beamforming in a multi-antenna of a communication network according to another embodiment of the present disclosure, and FIG. 13 is a conceptual diagram illustrating a fifth embodiment of a method for supporting beamforming in a multi-antenna of a communication network according to another embodiment of the present disclosure.

Referring to FIG. 12, the communication node including the multi-antenna 900 according to another embodiment of the present disclosure may respectively allocate the independent transmission beams to the plurality of communication nodes, and transmit data through the allocated transmission beams. Specifically, the plurality of communication nodes may be classified based on the service types of the plurality of communication nodes. For example, the plurality of communication nodes may include a first communication node 1211 of a first service type, a second communication node 1212 of the first service type, and a third communication node 1213 of the first service type. Also, the plurality of communication nodes may include a first communication node 1221 of a second service type and a second communication node 1222 of the second service type.

Also, the plurality of communication nodes may be classified based on the types of the plurality of communication nodes. For example, the plurality of communication nodes may include a first communication node 1211 of a first type, a second communication node 1212 of the first type, and a third communication node 1213 of the first type. Also, the plurality of communication nodes may include a first communication node 1221 of a second type and a second communication node 1222 of the second type.

Here, the plurality of communication nodes of the first service type is described as being the same as the plurality of communication nodes of the first type, but the embodiments of the present disclosure are not limited thereto. That is, the plurality of communication nodes of the first service type may not be the same as the plurality of communication nodes of the first type. Here, the communication node including the multi-antenna 1200 may simultaneously transmit data to the plurality of communication nodes through different independent transmission beams based on the service types of the plurality of communication nodes or the types of the plurality of communication nodes.

On the other hand, the communication node including the multi-antenna 1200 may not simultaneously transmit data through different independent transmission beams based on the service types of the plurality of communication nodes or the types of the plurality of communication nodes. This will be specifically described with reference to FIG. 13.

Referring to FIG. 13, the communication node including the multi-antenna 1200 may not simultaneously transmit data through different independent transmission beams based on the service type of the plurality of communication nodes or the type of the plurality of communication nodes. In this case, the multi-antenna 1200 may configure different beam indices or beam widths of the transmission beams transmitted to the plurality of communication nodes so that the plurality of communication nodes recognizes the transmission beams transmitted from the multi-antenna 1200.

Specifically, referring to (a) of FIG. 13, the communication node including the multi-antenna 1200 may allocate transmission beams having different beam indices according to the service types of the plurality of communication nodes or the types of the plurality of communication nodes. For example, the communication node including the multi-antenna 1200 may allocate transmission beams having a different beam index for each service type provided by the plurality of communication nodes, and transmit data to the plurality of communication node through the transmission beams. That is, the multi-antenna 1200 may be configured a beam index of the transmission beam for transmitting data to the first communication node 1211 of the first service type, the second communication node 1212 of the first service type, and the third communication node 1213 of the first service type differently from a beam index of the transmission beam for transmitting data to the first communication node 1221 of the second service type and the second communication node 1222 of the second service type.

Also, referring to (b) of FIG. 13, the multi-antenna 1200 (e.g., the communication node including the multi-antenna 1200) may allocate transmission beams having different beam widths according to the service types of the plurality of communication nodes or the types of the plurality of communication nodes. That is, regardless of the beam indices of the transmission beams for transmitting data to the plurality of communication nodes, the multi-antenna 1200 (e.g., the communication node including the multi-antenna 1200) may allocate transmission beams having a different beam width for each service type of the plurality of communication nodes or each type of the plurality of types of communication nodes.

For example, the communication node including the multi-antenna 1200 may allocate transmission beams having different beam widths according to the service types of the plurality of communication nodes, and transmit data to the plurality of communication nodes through the transmission beams having different beam widths. That is, the multi-antenna 1200 may be configured a beam width of the transmission beam for transmitting data to the first communication node 1211 of the first service type, the second communication node 1212 of the first service type, and the third communication node 1213 of the first service type, which is differently from a beam width of the transmission beam for transmitting data to the first communication node 1221 of the second service type and the second communication node 1222 of the second service type.

Figure 14:
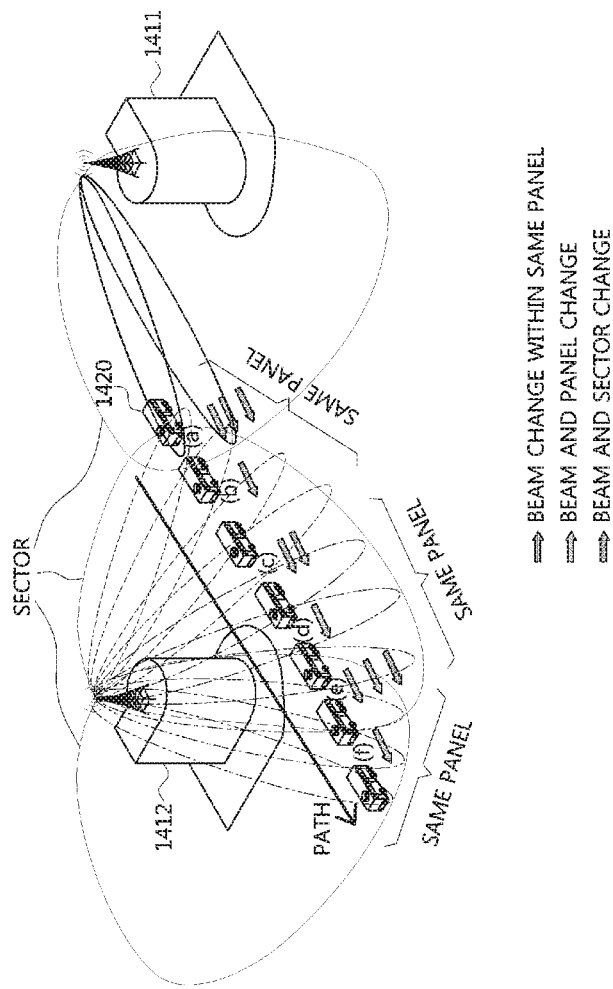
FIG. 14 is a conceptual diagram illustrating a first embodiment of a method for supporting beamforming for a moving communication node in a communication network according to another embodiment of the present disclosure.
Figure 15:
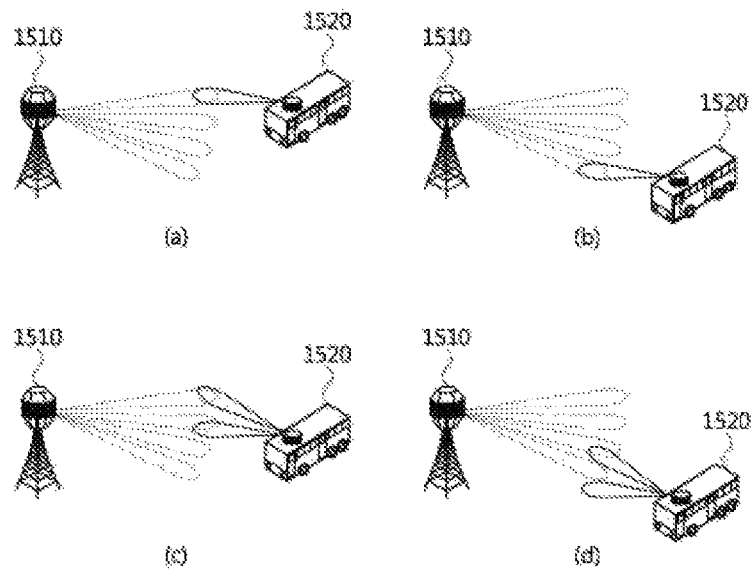
FIG. 15 is a conceptual diagram illustrating a second embodiment of a method for supporting beamforming for a moving communication node in a communication network according to another embodiment of the present disclosure.

FIG. 14 is a conceptual diagram illustrating a first embodiment of a method for supporting beamforming for a moving communication node in a communication network according to another embodiment of the present disclosure, and FIG. 15 is a conceptual diagram illustrating a second embodiment of a method for supporting bean forming for a moving communication node in a communication network according to another embodiment of the present disclosure.

Referring to FIGS. 14 and 15, in the case of supporting spatially divided beamforming and that a communication node receiving a beam moves, a process of changing or selecting a transmission beam at the multi-antenna in the communication network according to another embodiment of the present disclosure will be described.

First, referring to FIG. 14, the communication network according to the present disclosure may comprise a plurality of multi-antennas. In particular, the plurality of multi-antennas may include a first multi-antenna 1411 and a second multi-antenna 1412. A communication node 1420 receiving data from the first multi-antenna 1411 and the second multi-antenna 1412 in the communication network may move along a path from a data service area provided through beamforming of the first multi-antenna 1411 to a data service area provided through beamforming of the second multi-antenna 1412. At this time, the sectors and panels of the transmission beams through which data is transmitted to the communication node 1420 may vary depending on the path along which the communication node 1420 moves.

For example, when the communication node 1420 moves from a first location (a) to a second location (b) in the communication network, a sector of a transmission beam through which data is received at the communication node 1420 may be changed from a sector of the first multi-antenna 1411 to a sector of the second multiple antenna 1412. At this time, in a process of changing the sector of the transmission beam through which the data is received at the communication node 1420, a change may be made to a panel of the transmission beam and the transmission beam. Also, when the communication node 1420 moves from a third location (c) to a fourth location (d) in the communication network, a change may be made to a panel of the transmission beam through which the data is received at the communication node 1420. That is, the panel of the transmission beam through which the data is received at the communication node 1420 may be changed within a plurality of antenna panels included in the sector of the transmission beam through which the data is received at the communication node 1420. Also, when the communication node 1420 moves from a fifth location (e) to a sixth location (f), a change may be made to a sector of the transmission beam through which the data is received at the communication node 1420 and the transmission beam. That is, the sector of the transmission beam through which the data is received at the communication node 1420 may be changed within a plurality of sectors included in the second multi-antenna 1412.

Meanwhile, referring to FIG. 15, the communication network according to another embodiment of the present disclosure may comprise a multi-antenna 1510 for transmitting data through a transmission beam and a communication node for receiving data through the transmission beam from the multi-antenna 1520). At this time, the communication node 1520 may be a moving communication node. Here, the communication node including the multi-antenna 1510 may transmit data through a plurality of transmission beams. Also, the communication node 1520 that receives data from the multi-antenna 1510 via the transmission beam may perform reception beamforming and may have a plurality of reception beams.

In such the case, the multi-antenna 1510 may change the transmission beam for transmitting data as the communication node 1520 moves. Also, the communication node 1520 that receives data from the multi-antenna 1510 may perform reception beamforming to receive the data from the multi-antenna 1510. That is, the communication node 1520 may change a reception beam according to change of a transmission beam through which the data is transmitted from the multi-antenna 1520 in the process of moving.

Specifically, referring to (a) of FIG. 15, the communication node including the multi-antenna 1510 may transmit data to the communication node 1520 through a single transmission beam among a plurality of transmission beams capable of transmitting data. Here, according to the movement of the communication node 1520, a method of supporting beamforming by the multi-antenna 1520 may be changed from as shown in (a) to as shown in (b) and (d). That is, the transmission beam through which data is transmitted from the multi-antenna 1510 to the communication node 1520 may be changed. According to the movement of the communication node 1520, a method of supporting beamforming by the multi-antenna 1520 may be changed from as shown in (a) to as shown in (c) and (d). That is, the reception beam for receiving data transmitted through the transmission beam from the multi-antenna 1510 may be changed in the communication node 1520. Also, due to the movement of the communication node 1520, a method of supporting beamforming by the multi-antenna 1520 may be changed from as shown in (a) to as shown in (d). That is, the transmission beam through which data is transmitted from the multi-antenna 1510 to the communication node 1520 and the reception beam for receiving data transmitted from the multi-antenna 1510 through the transmission beam at the communication node 1520 may be changed.

Figure 16:
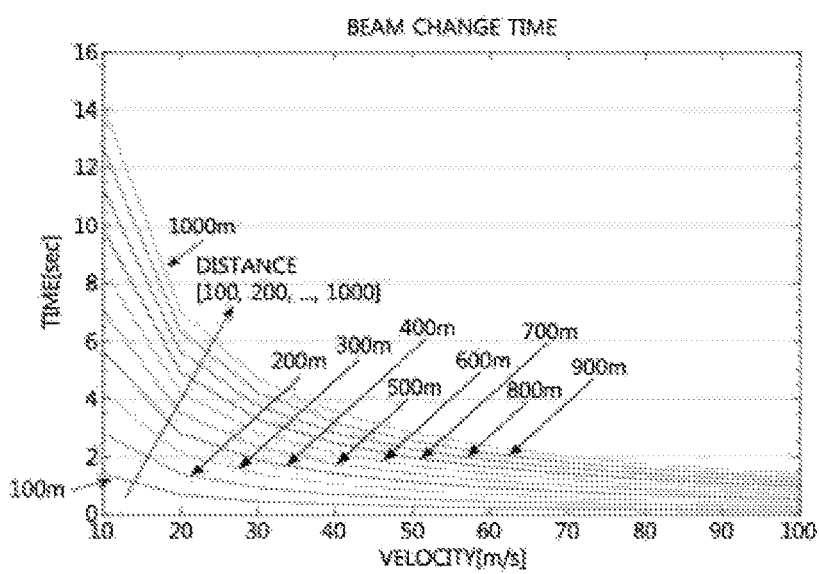
FIG. 16 is a graph illustrating a beam change time according to a distance and a velocity between a multi-antenna and a communication node in a communication network according to another embodiment of the present disclosure.
Figure 17:
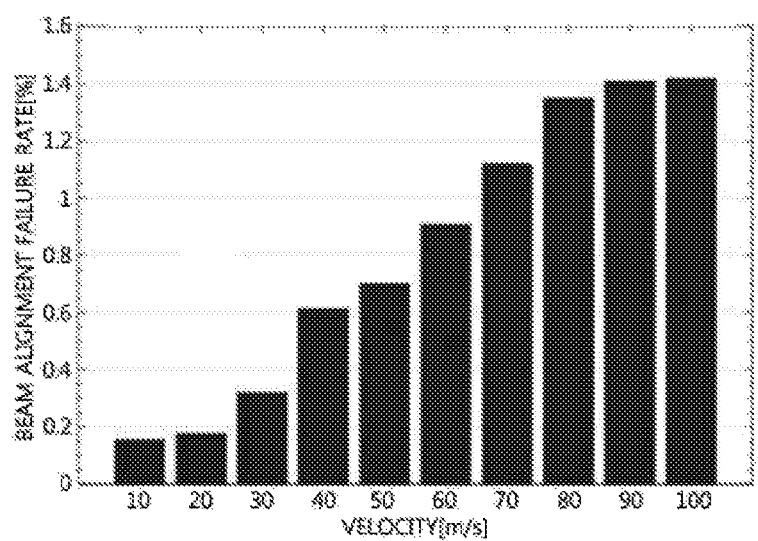
FIG. 17 is a graph illustrating a beam alignment failure rate according to a velocity of a communication node in a communication network according to another embodiment of the present disclosure.

FIG. 16 is a graph illustrating a beam change time according to a distance and a velocity between a multi-antenna and a communication node in a communication network according to another embodiment of the present disclosure, and FIG. 17 is a graph illustrating a beam alignment failure rate according to a velocity of a communication node in a communication network according to another embodiment of the present disclosure.

First, the x-axis of the graph shown in FIG. 16 may mean the velocity of the communication node receiving data from the multi-antenna through the transmission beam, and the y-axis may mean a beam change time during which a transmission beam of the multi-antenna changes due to the movement of the communication node. Also, the x-axis of the graph shown in FIG. 17 may mean the velocity of the communication node receiving data from the multi-antenna through the transmission beam, and the y-axis may mean the beam alignment failure rate.

Referring to FIGS. 16 and 17, when a distance between the multi-antenna and the communication node is short, or when the velocity of the communication node is high, the beam change may occur more frequently than when the distance between the multi-antenna and the communication node is long, or when the velocity of the communication node is low. That is, according to the graph shown in FIG. 17, it may also be seen that as the velocity of the communication node receiving data from the multi-antenna increases, the beam alignment failure rate increases.

Figure 18:
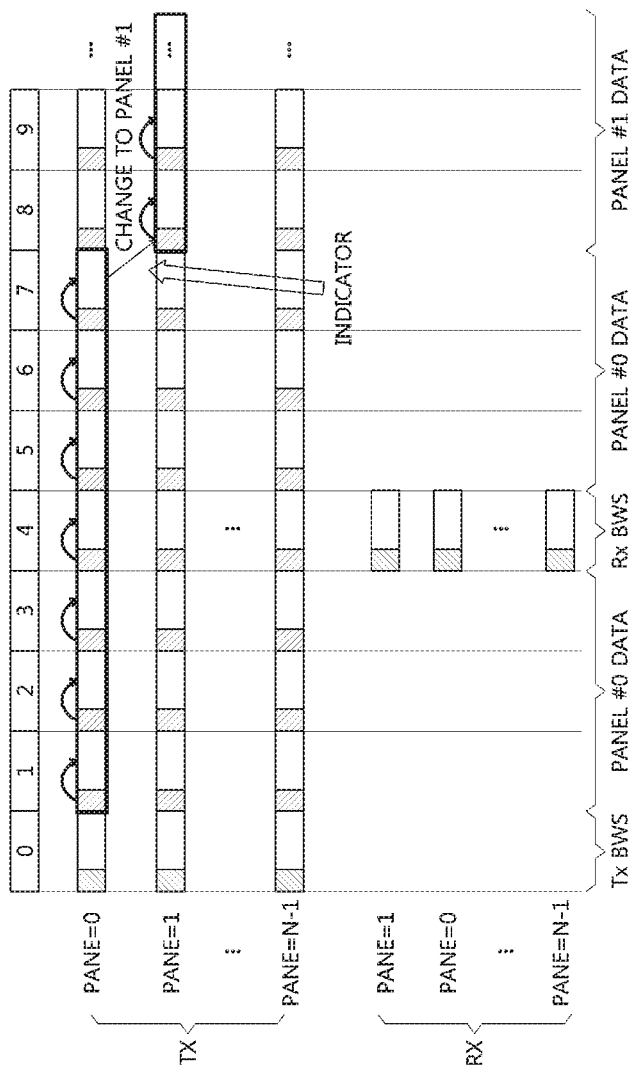
FIG. 18 is a conceptual diagram illustrating a first embodiment of a change of an antenna panel and a beam according to a panelized beamforming in a multi-antenna of a communication network according to another embodiment of the present disclosure.
Figure 19:
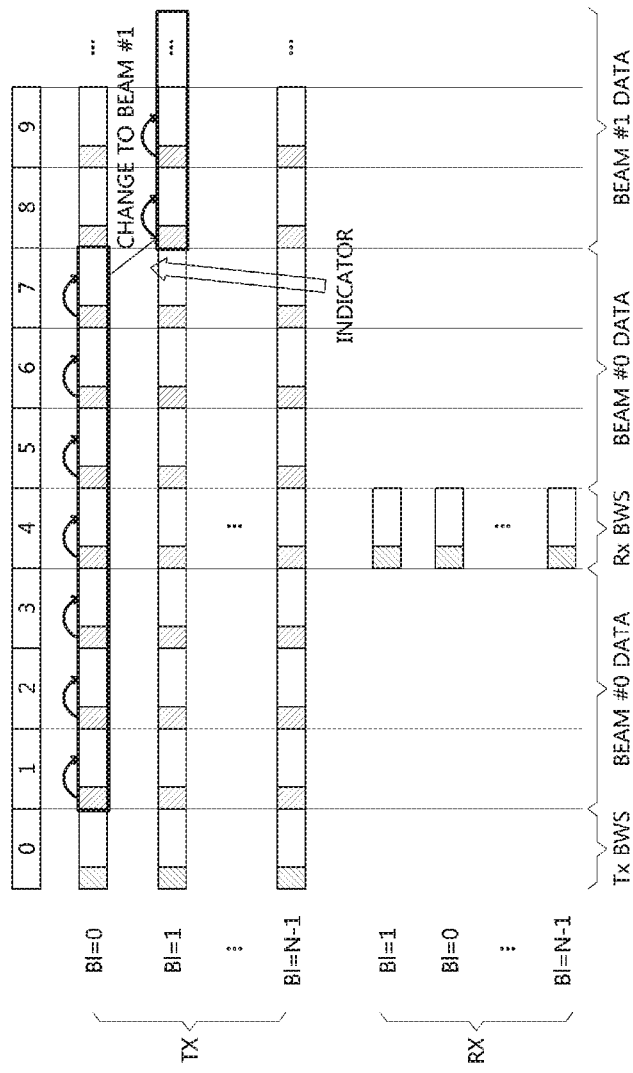
FIG. 19 is a conceptual diagram illustrating a second embodiment of a change of an antenna panel and a beam according to a panelized beamforming in a multi-antenna of a communication network according to another embodiment of the present disclosure.

FIG. 18 is a conceptual diagram illustrating a first embodiment of a change of an antenna panel and a beam according to a panelized beamforming in a multi-antenna of a communication network according to another embodiment of the present disclosure, and FIG. 19 is a conceptual diagram illustrating a second embodiment of a change of an antenna panel and a beam according to a panelized beamforming in a multi-antenna of a communication network according to another embodiment of the present disclosure.

Referring to FIGS. 18 and 19, in the case of performing beamforming based on the antenna panels in the multi-antenna of a communication network according to another embodiment of the present disclosure, a process of changing an antenna panel for generating a transmission beam and a process of changing the transmission beam may be identified. Here, the panelized beamforming performed in the multi-antenna may mean that data transmission is performed through independent transmission beams each of which is generated in each of the plurality of antenna panels included in the multi-antenna. Here, the multi-antenna may independently be configured by control channels (or control signals) for transmission of data in the same manner that data transmission is performed using the independent transmission beams respectively generated by the plurality of antenna panels.

In this regard, FIG. 18 illustrates a case where an antenna panel for generating a transmission beam through which data is transmitted is changed. At this time, the communication node including the multi-antenna may transmit an indicator indicating that the antenna panel generating the transmission beam through which the data is transmitted is changed, to the communication node receiving the data through the transmission beam. Also, when performing HARQ retransmission for data transmission, the communication node including the multi-antenna may perform the HARQ retransmission through a transmission beam generated by a changed antenna panel.

Meanwhile, FIG. 19 illustrates a case where a transmission beam is changed in the same antenna panel among the plurality of antenna panels included in the multi-antenna. At this time, the multi-antenna may perform a beam tracking such as a phase shift according to the change of the transmission beam in the same antenna panel.

Figure 21:
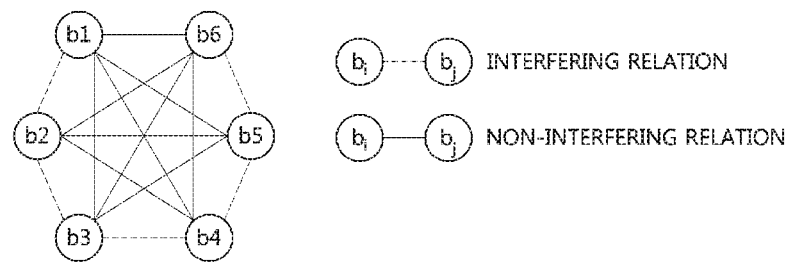
FIG. 21 is a conceptual diagram illustrating interference between adjacent beams of a multi-antenna of a communication network according to another embodiment of the present disclosure.

FIG. 20 is a conceptual diagram illustrating a muting based beam allocation performed in a multi-antenna of a communication network according to another embodiment of the present disclosure, and FIG. 21 is a conceptual diagram illustrating interference between adjacent beams of a multi-antenna of a communication network according to another embodiment of the present disclosure.

Referring to FIG. 20, a pattern of a beam formed according to beamforming in the multi-antenna may be formed to overlap with at least one adjacent transmission beam. Here, in the plurality of transmission beams through which data is transmitted from the multi-antenna, interference between adjacent transmission beams may occur. In order to resolve this problem, the multi-antenna may control the plurality of transmission beams such that data is not simultaneously transmitted through adjacent transmission beams among the plurality of transmission beams based on beam muting.

Specifically, (a) of FIG. 20 illustrates a case where a plurality of transmission beams that is part of all transmission beams capable of transmitting data in the multi-antenna are muted at a time $t_1$. Also, (b) of FIG. 20 illustrates a case where a plurality of transmission beams that is part of all transmission beams capable of transmitting data in the multi-antenna are muted at time $t_{i+1}$. In order to control not to transmit data through the transmission beams adjacent to each other at the same time among all the transmission beams capable of transmitting data in the multi-antenna, Equation 3 below may be defined.

Objective: to develop a slot-by-slot joint beam allocation & user scheduling algorithm, which determines:

$$(p(t))_{t=0}^{\infty}, \text{ where } p(t) \doteq (p_b(t), b \in \mathcal{B})$$

$$(I(t))_{t=0}^{\infty}, \text{ where } I(t) \doteq (I_b(t), b \in \mathcal{B}) \quad \text{[Equation 3]}$$

⇒ Optimization problem w/ long-term achieved throughput vector $R = (R_k : k \in \mathcal{K}_n)$:

$$(\text{Long-term } P) : \max \sum_{k \in \mathcal{K}_n} U_k(R_k)$$

Subject to $R \in \mathcal{R}$ where
- $U_k(\bullet)$: concave, strictly increasing, and continuously differentiable utility function for user k
- $\mathcal{R} \subset \mathbb{R}_+^K$: the set of all achievable rate vector over long-term, referred as throughput region $$R_k = \lim_{t \to \infty} \frac{1}{\tau} \sum_{\tau=1}^{t} \sum_{b \in \mathcal{B}} r_b^{k,n}(p_b(\tau), I_b(\tau))$$

Referring to FIG. 21, the multi-antenna may be redefined as a beam selection problem for selecting a transmission beam that is not affected by interference through a result according to interference between adjacent transmission beams n the multi-antenna, and control so as that adjacent transmission beams are not selected simultaneously by solving the redefined problem. Here, a combination of the transmission beams selectable in the multi-antenna may be defined as Equation 4 below. Based on this, it is possible to select one beam set of the total transmission beams capable of transmitting data in the multi-term.

$$F(\mathcal{B}) = \{B \mid I_b \not\subseteq B, B \not\subseteq \mathcal{B}\} \setminus \{\} \quad \text{[Equation 4]}$$

where $\mathcal{B} \doteq \{b_1, b_2, \ldots, b_{N_b}\}$ $I_b = \{\{b_i, b_j\} \mid f(b_i, b_j) = 1, \forall b_i, b_j \in \mathcal{B}, i \neq j\}$ $f(b_i, b_j) = \begin{cases} 1, & \text{if } b_i, b_j \text{ are interfereing each other,} \\ 0, & \text{otherwise} \end{cases}$ Further, the multi-antennas may select an optimal transmission beam by applying a weighting factor each time to select the optimal transmission beam among a plurality of transmission beams included in one beam set, as shown in Equation 5 below. In Equation 5, $w_{b_i}[t]$ which means the weighting factor, may be calculated as Equation 6 below.

$$\max \sum_{b_i \in G} w_{b_i}[t] \quad \text{[Equation 5]}$$

$G = \{b_i \mid b_i \in B, I_{b_i}^n = 1\}, G \in F(B)$ $$w_{b_i}[t] = \max_{p[t], I[t]} \sum_{k \in K_n} \frac{\bar{r}_{b_i}^{k,n}(p_{b_i})[t]}{\bar{R}_{b_i}^{k,n}[t-1]} \quad \text{[Equation 6]}$$

$\bar{R}_{b_i}^{k,n}[t] =$
$(1-\beta_1)\bar{R}_{b_i}^{k,n}[t-1] + \beta_1 I_{b_i}^{k,n}[t] r_{b_i}^{k,n}(p_{b_i})[t], \; \& \; \beta_1(\geq 0)$ is running averaging parameter $r_{b_i}^{k,n}(p_{b_i})[t]$: data transmission rate of receiving end (calculated from SINR)

Figure 22:
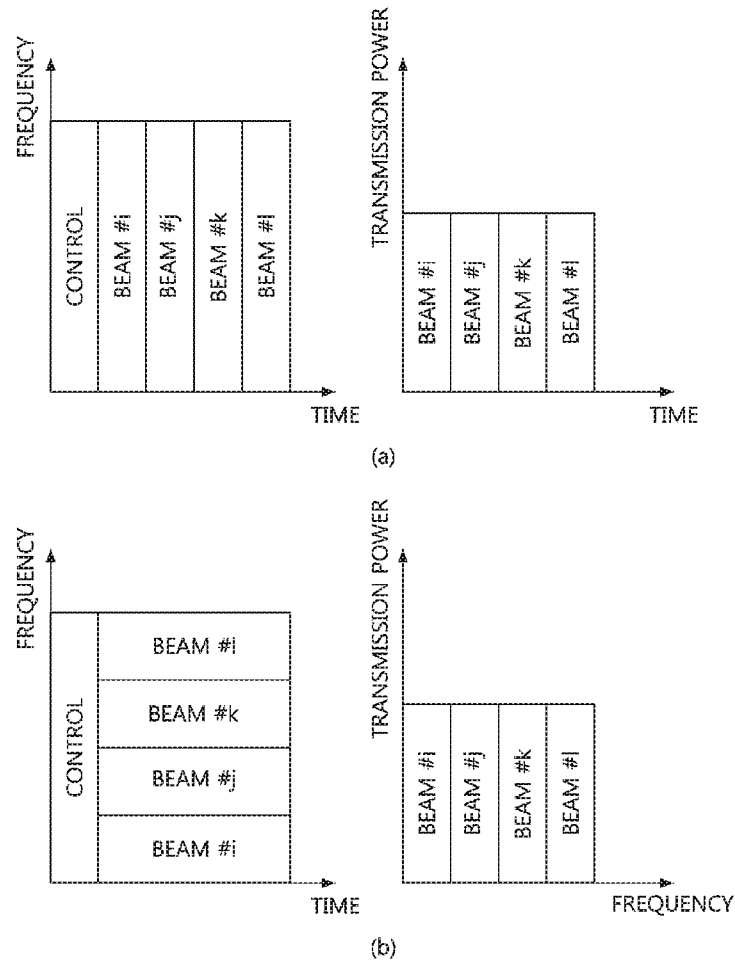
FIG. 22 is a conceptual diagram illustrating a first embodiment of a method for allocating a beam resource in a multi-antenna of a communication network according to another embodiment of the present disclosure.
Figure 23:
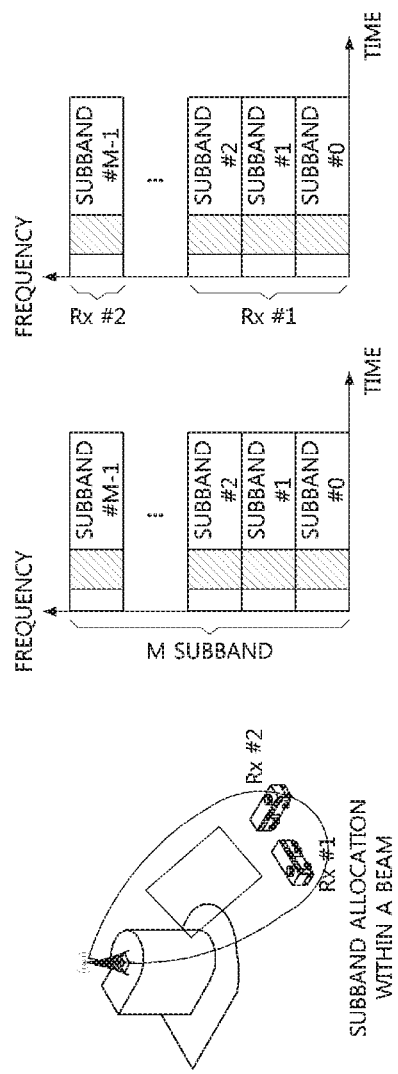
FIG. 23 is a conceptual diagram illustrating a second embodiment of a method for allocating a beam resource in a multi-antenna of a communication network according to another embodiment of the present disclosure.
Figure 24:
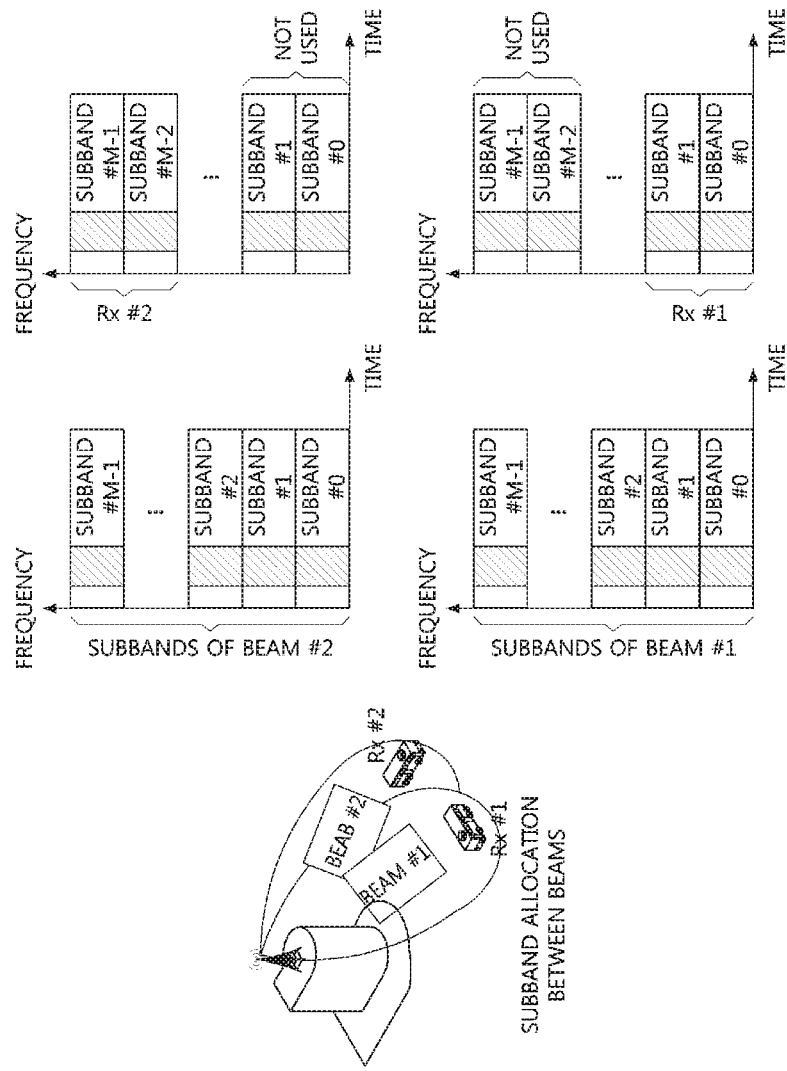
FIG. 24 is a conceptual diagram illustrating a third embodiment of a method for allocating a beam resource in a multi-antenna of a communication network according to another embodiment of the present disclosure.
Figure 25:
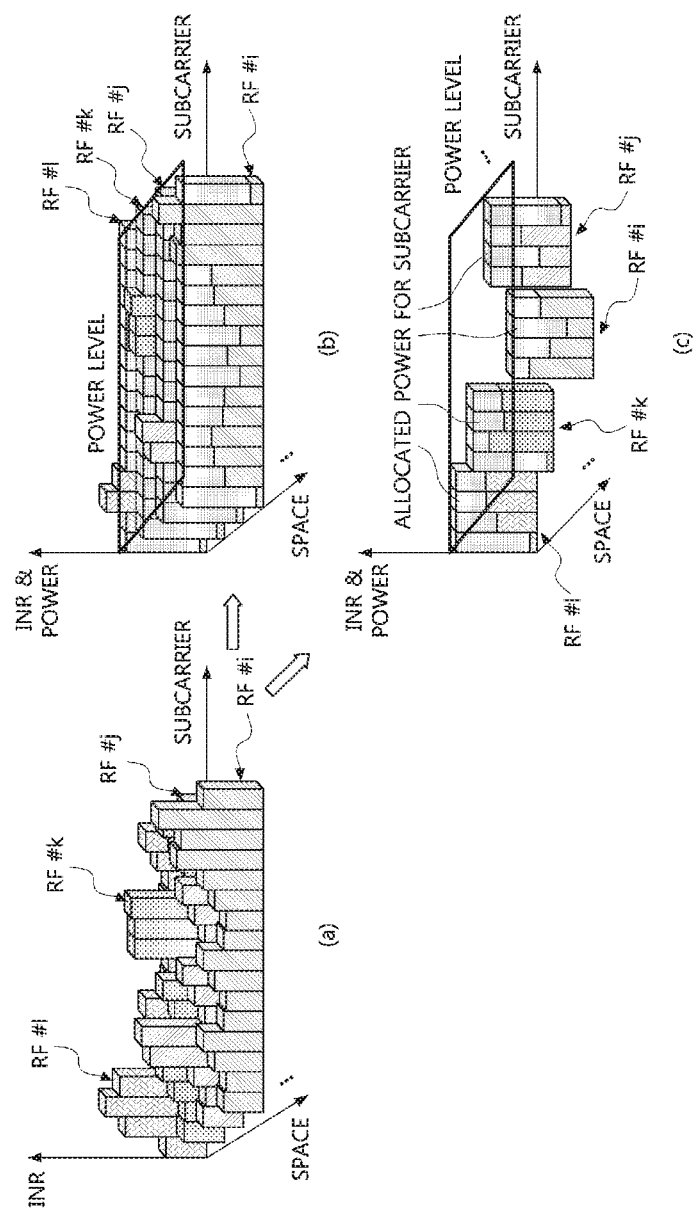
FIG. 25 is a conceptual diagram illustrating a fourth embodiment of a method for allocating a beam resource in a multi-antenna of a communication network according to another embodiment of the present disclosure.

$\bar{r}_{b_i}^{k,n}(p_{b_i})$: data transmission rate expected at tin a receiving end k through $b_i$ $\bar{r}_{b_i}^{k,n}(p_{b_i})[t] = (1-\beta_2)\bar{R}_{b_i}^{k,n}[t-1] + \beta_2 I_{b_i}^{k,n}[t] r_{b_i}^{k,n}(p_{b_i})[t-1]$, & $\beta_2(\geq 0)$ is running averaging parameter FIG. 22 is a conceptual diagram illustrating a first embodiment of a method for allocating a beam resource in a multi-antenna of a communication network according to another embodiment of the present disclosure, FIG. 23 is a conceptual diagram illustrating a second embodiment of a method for allocating a beam resource in a multi-antenna of a communication network according to another embodiment of the present disclosure, FIG. 24 is a conceptual diagram illustrating a third embodiment of a method for allocating a beam resource in a multi-antenna of a communication network according to another embodiment of the present disclosure, and FIG. 25 is a conceptual diagram illustrating a fourth embodiment of a method for allocating a beam resource in a multi-antenna of a communication network according to another embodiment of the present disclosure.

Referring to FIG. 22, the multi-antenna in a communication network according to another embodiment of the present disclosure may spatially divide a beam resource region to solve interference between transmission beams. The x-axis of the graph shown in FIG. 22 may represent time resources, and the y-axis shown in FIG. 22 may represent frequency resources.

Specifically, according to (a) of FIG. 22, the multi-antenna may spatially divide the beam resource region so as not to overlap in the time domain. Also, according to (b) of FIG. 22, the multi-antenna may spatially divide the beam resource region so as not to overlap in the frequency domain. Thereby, the multi-antenna can mitigate interference between adjacent transmission beams. Here, the multi-antenna may divide the entire band for the transmission beams into M specific units of frequency (e.g., subbands), and may allocate the divided units of frequency based on beam measurement results (e.g., N measurement result) received from communication nodes receiving data through the transmission beams.

In addition, referring to FIG. 23, a process of allocating the subbands within a beam in the multi-antenna of another communication network of the present disclosure may be identified. Specifically, the multi-antenna may allocate transmission beams for different communication nodes based on the beam measurement results for N subbands among the M subbands in a resource formed in one beam (e.g., a frame). For example, the multi-antenna may allocate a transmission beam to a first communication node RX1 in subbands #0 through #2 and allocate a transmission beam to a second communication node RX2 in subbands #M-1.

In addition, referring to FIG. 24, a process of allocating the subbands between beams in the multi-antenna of a communication network according to another embodiment of the present disclosure may be identified. Also, referring to FIG. 25, it may be seen that the process of allocating a beam power in the multi-antenna of a communication network according to another embodiment of the present disclosure.

For example, the multi-antenna may apply the resource allocation scheme for subbands in a single transmission beam to a resource allocation process for adjacent transmission beams. Specifically, the multi-antenna may allocate subbands #0 to #1 among a plurality of subbands corresponding to a first transmission beam (i.e., beam #1) to the first communication node RX1, and may not use subbands #M-1 to #M-2 which a second transmission beam (i.e., beam #2) uses. Here, the multi-antennas may allocate the subbands #M-1 to #M-2 among a plurality of subbands corresponding to the second transmission beam to a third communication node RX3, and may not use the subbands #0 to #1 which the first transmission beam uses.

The method of allocating beam resources performed in the multi-antenna of a communication network according to another embodiment of the present disclosure, which was described with reference to FIGS. 22 to 24, may be described as a system (or an algorithm) including a plurality of steps as shown in the following Table 2.

TABLE 2

| Step 1 | receiver measures subband RSSI (optionally wideband RSSI or N best subbands) and reports the result of the measurement |
|---|---|

(linear averaged) Wideband RSSI:

$$\frac{1}{\sum_{s}^{N_{SB}-1} N_S^{SC}} \sum_{s=0}^{N_{SB}-1} \sum_{k=0}^{N_S^{SC}-1} \text{RSSI}[k]$$

(linear averaged) subband RSSI:

$$\frac{1}{N_S^{SC}} \sum_{k=0}^{N_S^{SC}-1} \text{RSSI}[k]$$

| Step 2 | transmitter schedules in unit of subband based on the measurement report |
|---|---|
| Step 3 | receiver measures the scheduled subband(s) and report the result of the measurement |

(linear averaged) scheduled subband RSSI:

$$\frac{1}{\sum_{s}^{N_{SB}-1} I_S N_S^{SC}} \sum_{s=0}^{N_{SB}-1} I_S \sum_{k=0}^{N_S^{SC}-1} \text{RSSI}[k],$$

where $I_S = 1$ if the subband is scheduled, $I_S = 0$ otherwise. Additionally, other (best N) subband RSSI is measured and report the result of the measurement TABLE 2-continued $$\frac{1}{N_S^{SC}} \sum_{k=0}^{N_S^{SC}-1} \text{RSSI}[k] \geq \frac{1}{\sum_{s}^{N_{SB}-1} I_S N_S^{SC}} \sum_{s=0}^{N_{SB}-1} I_S \sum_{k=0}^{N_S^{SC}-1} \text{RSSI}[k]$$

or the best N subbands

| Step 4 | go to step 2 |
|---|---|

In addition, referring to FIG. 25, a process of allocating beam power of the multi-antenna in a communication network according to another embodiment of the present disclosure may be identified. Specifically, the multi-antenna may allocate power of a transmission beam through which data is transmitted in consideration of interference and received signal strength. That is, referring to (a) of FIG. 25, INR for subcarriers of each transmission beam through which data is transmitted may be identified. In this regard, (b) of FIG. 25 illustrates a method of allocating power for a transmission beam through which data is transmitted. Also, (c) of FIG. 25 illustrates a method of allocating power for a transmission beam through which data is transmitted based on a frequency selective power allocation scheme. For example, the multi-antenna may allocate power for a transmission beam based on a system (or algorithm) as shown in Table 3 below.

TABLE 3

| Objective | maximise $\sum_{b_i \in b_B} \sum_k \text{SINR}_{b_{i,k}}$ |
|---|---|

$$\text{where SINR}_{b_{i,k}} = \frac{p_r^{b_{i,k}}}{WN_0 + \sum_{b_j \in b_B \setminus b_i} p_r^{b_{j,k}}}$$

| Method | Redefine as a power allocation |
|---|---|

$$(P): \max_{p[t]} \sum_{n \in \mathcal{N}} \sum_{b \in \mathcal{B}} U'(\overline{R}_b^{k(n,b),n}[t-1]) r_b^{k(n,b),n}(p_b)[t]$$

$$\text{subject to } \sum_{b \in \mathcal{B}} p_b^n[t] \leq P^{n,max}[t], \forall n \in \mathcal{N}$$

$$p_b^n[t] \leq p_b^{n,mask}[t], \forall n \in \mathcal{N}, b \in \mathcal{B}$$

$$P_{b_i}[t] = \begin{cases} \frac{1}{N_b} P^{max}, & t = 0, \\ \begin{cases} P_{min}, & \text{if no receiver is served by the beam } i, \\ \omega_{b_i}[t]P[t], & \text{otherwise.} \end{cases} & t > 0, \end{cases}$$

where $$\omega_{b_i}[t] = \frac{\sum_{b_j \in b_B} \overline{R}_{b_j}[t] - \overline{r}_{b_i}[t-1]}{\sum_{b_m \in b_B} \left( \sum_{b_j \in b_B} \overline{R}_{b_j}[t] - \overline{r}_{b_m}[t-1] \right)}$$

P[t]: power to allocate at time t$\overline{R}_{b_i}[t] = (1 - \beta)\overline{r}_{b_i}[t] + \beta r_{b_i}[t-1]$
$\beta \geq 0$: running averaging parameter
$r_{b_i}[t]$: actual data rate of beam $b_i$, calculated by the feedback CSI from served by the beam $b_i$;

TABLE 3-continued $$r_{b_i}[t] = \frac{1}{N_{b_i}^k} \sum_{k=1}^{N_{b_i}^k} r_{b_i}^k[t]$$

$r_{b_i}^k[t]$: data rate of receiver served by $b_i$ at slot t:

$$r_{b_i}^k[t] = \log_2\left(1 + \gamma_{b_i(p_{b_i})}^k[t]\right)$$

where $\gamma_{b_i(p_{b_i})}^k[t]$ is SINR served by $b_i$ at slot t:

$$\gamma_{b_i(p_{b_i})}^k[t] = \frac{g_{b_i}^k[t]p_{b_i}[t]}{\sum_{b_j \in \mathcal{B}\backslash b_i} g_{b_j}^k[t]p_{b_j}[t] + \sigma_{b_i}[t]}$$

$\bar{r}_{b_i}[t]$: actual data rate of beam $b_i$, calculated by the feedback CSI ($r_{b_i}^k[t]$) from served by the beam $b_i$:

$$\bar{r}_{b_i}[t] = (1-\alpha)\bar{r}_{b_i}[t-1] + \alpha \sum_{k \in \mathcal{K}_n} r_{b_i}^k[t]$$

$\alpha \geq 0$: running averaging parameter

Meanwhile, in a communication network according to another embodiment of the present disclosure, the multi-antenna can perform minimum beam power allocation. That is, when data is transmitted to a plurality of communication nodes through one transmission beam based on a system (or algorithm) shown in Table 4 below, the multi-antenna may maximize SINR at the plurality of communication nodes according to the power allocated to each transmission beam. In this case, the multi-antenna may allocate the power of the transmission beam satisfying the required SINR value as shown in Equation 7 below.

TABLE 4

| Objective | maximise $\sum_{b_i \in b_\mathcal{B}} \sum_j \text{SINR}_{b_{i,j}}$ |
|---|---|
| Method | s.t Minimum acceptable $\text{SINR}_{b_{i,j}}$ for beam $b_{i,j}$: $v_{b_{i,j}}$ (i.e., $\text{SINR}_{b_{i,j}} \geq v_{b_{i,j}}$) where $$\text{SINR}_{b_{i,j}} = \frac{p_r^{b_{i,j}}}{WN_0 + \sum_{b_n \in b_\mathcal{B}\backslash b_i} p_r^{b_{n,j}}}$$ $$p_r^{b_{i,j}} = \left|a_r^H(\hat{\psi}, \hat{\phi})HF_A(\hat{\varphi}, \hat{\theta})p_{b_{i,j}}\right|^2$$ $$\sum_{b_n \in b_\mathcal{B}\backslash b_i} p_r^{b_{n,j}} = \sum_{(\bar{\varphi}_h, \bar{\theta}_v) \in \phi \times \Theta\backslash\{(\hat{\varphi},\hat{\theta})\}} \left|a_r^H(\hat{\psi}, \hat{\phi})HF_A(\bar{\varphi}_h, \bar{\theta}_v)p_i\right|^2$$ |

$$|p_{b_{i,j}}|^2 \geq \quad [\text{Equation 7}]$$

$$v_{b_{i,j}} \times \frac{WN_0 + \sum_{(\bar{\varphi}_h, \bar{\theta}_v) \in \phi \times \Theta\backslash\{(\hat{\varphi},\hat{\theta})\}} \left|a_r^H(\hat{\psi}, \hat{\phi})HF_A(\bar{\varphi}_h, \bar{\theta}_v)p_i\right|^2}{\left|a_r^H(\hat{\psi}, \hat{\phi})HF_A(\hat{\varphi}, \hat{\theta})\right|^2}$$

from $\frac{\left|a_r^H(\hat{\psi}, \hat{\phi})HF_A(\hat{\varphi}, \hat{\theta})p_{b_{i,j}}\right|^2}{WN_0 + \sum_{(\bar{\varphi}_h, \bar{\theta}_v) \in \phi \times \Theta\backslash\{(\hat{\varphi},\hat{\theta})\}} \left|a_r^H(\hat{\psi}, \hat{\phi})HF_A(\bar{\varphi}_h, \bar{\theta}_v)p_i\right|^2} \geq v_{b_{i,j}}$ Meanwhile, in a communication network according to another embodiment of the present disclosure, when the multi-antenna reduces power for one transmission beam, interference of a communication node served through another transmission beam may be reduced. Accordingly, the multi-antenna may have an SINR gain of the another transmission beam and may have SINR gains of the entire transmission beams transmitted by the multi-antenna. In this regard, the multi-antenna may be redefined as a problem for the SINR gains in the multi-antenna based on a system (or algorithm) shown in Table 5 below.

TABLE 5

| Objective | minimize the transmission power $p_{b_i}$ for each beam i, meeting the required the $\text{SINR}(v_{b_i})$, $\forall b_i \in b_\mathcal{B}$ |
|---|---|
| Method | How to allocate $p_{b_i}$? $$p_{b_i}(t+1) = \frac{\bar{v}_{b_i}(t)}{\left|a_r^H(\hat{\psi}, \hat{\phi})HF_A(\hat{\varphi}, \hat{\theta})\right|^2}\left(WN_0 + \sum_{b_n \in b_\mathcal{B}\backslash b_i} p_r^{b_{n,j}}(t)\right)$$ $$p_{b_i}(t+1) = \frac{\bar{v}_{b_i}(t)p_{b_i}(t)}{\text{SINR}_{b_{i,j}}(t)}$$ where $\bar{v}_{b_i}(t)$: running average of SINR @ time t $$\bar{v}_{b_i}(t) = \begin{cases} v_{b_{i,j}}, \text{if } t=0 \\ \min[(1-\beta_3)\bar{v}_{b_i}(t-1) + \beta_3\text{SINR}_{b_{i,j}}(t), v_{b_{i,j}}], \text{otherwise,} \end{cases}$$ where $\beta_3 (\geq 0)$: running averaging parameter $\text{SINR}_{b_{i,j}}(t)$: reported by receiver at time t |

Meanwhile, in a communication network according to another embodiment of the present disclosure, the multi-antenna may perform joint beam power allocation and user scheduling. Specifically, the multi-antenna may select communication nodes achieving utility maximization of all the communication nodes that receive data through the transmission beams of the multi-antenna, and use a scheme for optimizing the power of the transmission beam for transmitting data to the selected communication nodes to optimize the transmission beam through which the data is transmitted and scheduling. In this regard, multiple antennas may define a plurality of system models as shown in Table 6 below.

TABLE 6

| | |
|---|---|
| Network & traffic model | $\mathcal{K} \doteq \{1, \ldots, K\}$: the set of users<br>$\mathcal{N} \doteq \{1, \ldots, N\}$: the set of BSs (transmitters)<br>$\mathcal{K}_n$: the (nonempty) set of users associated w/ the transmitter n<br>$\mathcal{K} = \mathcal{K}_1 \cup \ldots \cup \mathcal{K}_N$<br>$\mathcal{K}_n \cap \mathcal{K}_m = \emptyset$ for $n \neq m$<br>Full buffer traffic model w/ infinite data packets in the queues for each user @ its associated transmitter (best-effort traffic) |
| Resource & allocation model | $\mathcal{B} \doteq \{1, \ldots, B\}$: the set of beams of the transmitter n @ each slot, each transmitter needs to determine:<br>Which user is scheduled on each beam<br>How much power is allocated for each scheduled user on each beam<br>User scheduling constraint:<br><br>$$\sum_{k \in \mathcal{K}} I_b^{k,n}(t) \leq 1, \forall n \in \mathcal{N}, b \in \mathcal{B}$$<br><br>where user scheduling indictor vector: $I_b(t) \doteq [I_b^{k,n}(t): k \in \mathcal{K}_n, b \in \mathcal{B}]$<br><br>$$I_b^{k,n}(t) = \begin{cases} 1, & \text{when transmitter n schedules its associated user k on beam b at slot t,} \\ 0, & \text{otherwise.} \end{cases}$$<br><br>Power constraint:<br><br>$$\sum_{b \in \mathcal{B}} p_b^n(t) \leq P^{n,max}, \forall n \in \mathcal{N}$$<br><br>$$p_b^n(t) \leq p_b^{n,mask}, \forall n \in \mathcal{N}, b \in \mathcal{B}$$<br><br>where<br>$p_b^n(t)$: transmit power of transmitter n for the beam b at slot t<br>vector containing transmit power of all transmitters on beam b:<br>$p_b(t) \doteq [p_b^1(t), p_b^2(t), \ldots p_b^N(t)]^T$<br>vector containing transmit power of all beams for transmitter n:<br>$p^n(t) \doteq [p_1^n(t), p_2^n(t), \ldots p_B^n(t)]^T$ |
| Link model | achievable data rate for user k on beam b:<br><br>$$r_b^{k,n}(p_b) = B \log_2\left(1 + \frac{1}{\Gamma}\gamma_b^{k,n}(p_b)\right)$$<br><br>where<br>$\Gamma$: SINR gap to capacity (a function of the desired BER, coding gain and noise margin)<br><br>$\gamma_b^{k,n}(p_b)$: received SINR for user k from transmitter n on the beam b:<br><br>$$\gamma_b^{k,n}(p_b) = \frac{g_b^{k,n}p_b^n}{\sum_{b_j \neq b} g_{b_j}^{k,n}p_{b_j}^n + \sum_{m \neq n, m \in \mathcal{N}} \sum_{b_m \in \mathcal{B}_m} g_{b_m}^{k,m}p_{b_m}^m + \sigma_b^k}$$<br><br>where<br>$p_b^n$: nonnegative transmit power of transmitter n on beam b<br>$g_b^{k,n}$: channel gain b/w transmitter n and user k on beam b during a slot<br>$\sigma_b^k$: noise power<br>$r_b^{k,n}(p_b)$ is potential data rate when the user k is scheduled for service by the transmitter n on the beam b and its actual data rate is zero when another user is scheduled. |

In a communication network according to another embodiment of the present disclosure, the multi-antenna may apply a stochastic gradient-based algorithm to beam power and user allocation based on a plurality of models as shown in Table 6. Through this, the multi-antenna may be redefined and solve a problem of how to select a user to be allocated to each transmission beam as shown in Table 7 below.

cation node among a plurality of communication nodes receiving data from the multi-antenna through the transmission beams.

That is, a plurality of communication nodes receiving data transmitted from the multi-antenna may receive the data through the transmission beams, and may report measurement results on the transmission beams through which data is transmitted to the multi-antenna. The communication

TABLE 7

Re-define    Joint power allocation and user scheduling algorithm @ every time (using stochastic gradient-based algorithm to a long-term utility maximization problem, Long-term P):

$$(P): \max_{p[t],I[t]} \sum_{k \in \mathcal{K}_n} \sum_{b \in \mathcal{B}} U'(\overline{R}_b^{k,n}[t-1]) r_b^{k,n}(p_b, I_b)[t]$$

$$\text{subject to } \sum_{k \in \mathcal{K}_n} I_b^{k,n}[t] \leq 1, \forall n \in \mathcal{N}, b \in \mathcal{B}$$

$$\sum_{b \in \mathcal{B}} p_b^n[t] \leq P^{n,max}[t], \forall n \in \mathcal{N}$$

$$p_b^n[t] \leq p_b^{n,mask}[t], \forall n \in \mathcal{N}, b \in \mathcal{B}$$

where $\overline{R}_b^{k,n}(p_b, I_b)[t] = (1 - \beta_1)\overline{R}_b^{k,n}(p_b, I_b)[t-1] + \beta_1 r_b^{k,n}(p_b)[t]$, & $\beta_1 (\geq 0)$ is running averaging parameter Decompose intra-beam user scheduling problems:

Slot-by-slot I (for all beam) user scheduling algorithm for a given power:

$$I_b^{k,n}[t] = \begin{cases} 1, & \text{if } k = k(n, b) = \underset{k \in \mathcal{K}_n}{\text{argmax}} \ U'(\overline{R}_b^{k,n}[t-1]) r_b^{k,n}(p_b)[t] \\ 0, & \text{otherwise.} \end{cases}$$

Slot-by-slot P power allocation for a given user scheduling I:

$$(P): \max_{p[t]} \sum_{n \in \mathcal{N}} \sum_{b \in \mathcal{B}} U'(\overline{R}_b^{k(n,b),n}[t-1]) r_b^{k(n,b),n}(p_b)[t]$$

$$\text{subject to } \sum_{b \in \mathcal{B}} p_b^n[t] \leq P^{n,max}[t], \forall n \in \mathcal{N}$$

$$p_b^n[t] \leq p_b^{n,mask}[t], \forall n \in \mathcal{N}, b \in \mathcal{B}$$

where
$\overline{R}_b^{k,n}[t]$: long-term throughput for user k until time slot t & $\overline{R}_b^{k(n,b),n}[t] = (1 - \beta_2)\overline{R}_b^{k(n,b),n}[t-1] + \beta_2 r_b^{k(n,b),n}(p_b)[t]$
$\beta_2 (\geq 0)$: running avearing parameter
$r_b^{k(n,b),n}(p_b)$: actual data rate of user k at slot t & feedback from user k at slot t &

$$r_b^{k(n,b),n}(p_b)[t] = \log_2\left(1 + \frac{g_b^{k(n,b),n}[t]p_b^n[t]}{\sum_{b_j \neq b} g_{b_j}^{k(n,b),n}[t]p_{b_j}^n[t] + \sum_{m \neq n, m \in \mathcal{N}} \sum_{b_m \in \mathcal{B}_m} g_{b_m}^{k(n,b),n}[t]p_{b_m}^m[t] + \sigma_b^{k(n,b)}[t]}\right)$$

$$g_b^{k(n,b),n}[t]p_b^n[t] = \left|a_r^H(\hat{\psi}, \hat{\phi}) H F_A(\hat{\varphi}, \hat{\theta}) p_{b(\hat{\varphi},\hat{\theta})}^n[t]\right|^2$$

$$\sum_{b_j \neq b} g_{b_j}^{k(n,b),n}[t]p_{b_j}^n[t] = \sum_{(\overline{\varphi}_h, \overline{\theta}_v) \in \Phi \times \Theta \setminus \{(\hat{\varphi},\hat{\theta})\}} \left|a_r^H(\hat{\psi}, \hat{\phi}) H F_A(\overline{\varphi}_h, \overline{\theta}_v) p_{b(\overline{\varphi}_h, \overline{\theta}_v)}^n[t]\right|^2$$

$$\sum_{m \neq n, m \in \mathcal{N}} \left(\sum_{b_m \in \mathcal{B}_m} g_{b_m}^{k(n,b),n}[t]p_{b_m}^m[t]\right) = \sum_{m \neq n} \left(\sum_{(\overline{\varphi}_h, \overline{\theta}_v) \in \Phi \times \Theta} \left|a_r^H(\hat{\psi}, \hat{\phi}) H F_A(\overline{\varphi}_h, \overline{\theta}_v) p_{b(\overline{\varphi}_h, \overline{\theta}_h)}^m[t]\right|^2\right)$$

Meanwhile, in a communication network according to another embodiment of the present disclosure, the multi-antenna may perform joint relay allocation and user scheduling. Specifically, the performance of a service may be degraded due to movement of many users using a wireless channel and communication nodes serving as users' terminals. In order to solve this problem, the multi-antenna may provide services by simultaneously transmitting data through two or more transmission beams, and by transmitting data to a plurality of communication nodes (i.e., a plurality of users) through a single transmission beam. Also, the multi-antenna can improve the data transmission rate by selecting a relay capable of relaying to another communinode including the multi-antenna may then transmit data directly to at least one communication node or to at least one communication node through a relayable communication node. At this time, the relayable communication node may receive data from the multi-antenna, and relay the received data to a communication node, which is a destination of the data. In this regard, a method of providing a service based on beamforming in the multi-antenna will be described in detail with reference to FIGS. 26 and 27 below.

FIG. 26 is a conceptual diagram illustrating a method of providing a beamforming-based service in a communication network according to another embodiment of the present disclosure, and FIG. 27 is a conceptual diagram illustrating a beamforming-based service topology in a communication network according to another embodiment of the present disclosure.

Specifically, (a) of FIG. 26 illustrates a case where the multi-antenna provides a service by performing beamforming in a point-to-multipoint (p2mp) scheme. Also, (b) of FIG. 26 illustrates a case where the multi-antenna provides a service by performing beamforming in a relaying scheme. Also, (c) of FIG. 26 illustrates a case where the multi-antenna provides a service by performing beamforming in the p2mp scheme and the relaying scheme. Referring to FIG. 27, a plurality of beamforming service topologies representing the beamforming service providing method described with reference to FIG. 26 may be identified.

In this regard, the multi-antenna may define a plurality of system models, such as those shown in Table 8 below. Through these, the multi-antenna may select and perform scheduling on a communication node to which data is transmitted via a relaying and a communication to which data is directly transmitted based on beam channel states reported by communication nodes.

TABLE 8

| | |
|---|---|
| Network & traffic model | $\mathcal{K} \doteq \{1, \ldots, K\}$: the set of users<br>$\mathcal{N} \doteq \{1, \ldots, N\}$: the set of BSs (transmitters)<br>$\mathcal{R} \doteq \{1, \ldots, R\}$: the set of RSs (relaying users)<br>$\mathcal{K}_n$: the (nonempty) set of users associated w/ the transmitter(BS/RS) n<br>$\mathcal{K} = \mathcal{K}_1 \cup \ldots \cup \mathcal{K}_N$<br>$\mathcal{K}_n \cap \mathcal{K}_m = \emptyset$ for n ≠ m<br>$\mathcal{R}_n$: the (nonempty) set of relyas associated w/ the transmitter(BS) n<br>$\mathcal{R} = \mathcal{R}_1 \cup \ldots \cup \mathcal{R}_N$<br>$\mathcal{R}_n \cap \mathcal{R}_m = \emptyset$ for n ≠ m<br>$\mathcal{K}_r$: the (nonempty) set of users associated w/ the transmitter(RS) r<br>$\mathcal{K} = \mathcal{K}_1 \cup \ldots \cup \mathcal{K}_R$<br>$\mathcal{K}_r \cap \mathcal{R}_s = \emptyset$ for n ≠ s<br>Full buffer traffic model w/ infinite data packets in the queues for each user @ its associated transmitter (best-effort traffic) |
| Resource & allocation model | $\mathcal{B}_n \doteq \{1, \ldots, B_n\}$: the set of beams of the transmitter(BS/RS) n @ each slot, each transmitter(BS/RS) needs to determine:<br>Whether relaying is needed or not & if yes, which user is in role of relaying<br>Which user (including selected user as an RS) is scheduled on each beam of BS<br>Which user (not selected user as an RS, scheduled by BS) is scheduled on each beam of RS<br>How much power is allocated for each scheduled user on each beam<br>User scheduling constraint:<br>$$\sum_{k \in \mathcal{K}} I_b^{k,n}(t) \leq 1, \forall n \in \mathcal{N} \cup \mathcal{R}, b \in \mathcal{B}_n$$<br>where user scheduling indictor vector: $I_b(t) \doteq [I_b^{k,n}(t): k \in \mathcal{K}_n, b \in \mathcal{B}_n$<br>$$I_b^{k,n}(t) = \begin{cases} 1, & \text{when transmitter n schedules its associated user k on beam b at slot t,} \\ 0, & \text{otherwise.} \end{cases}$$<br>Power constraint:<br>$$\sum_{b \in \mathcal{B}} p_b^n(t) \leq P^{n,max}, \forall n \in \mathcal{N} \cup \mathcal{R}$$<br>$$p_b^n(t) \leq p_b^{n,mask}, \forall n \in \mathcal{N} \cup \mathcal{R}, b \in \mathcal{B}_n$$<br>where<br>$p_b^n(t)$: transmit power of transmitter n for the beam b at slot t<br>vector containing transmit power of all transmitters on beam b:<br>$p_b(t) \doteq [p_b^1(t), p_b^2(t), \ldots p_b^N(t)]^T$<br>vector containing transmit power of all beams for transmitter n:<br>$p^n(t) \doteq [p_1^n(t), p_2^n(t), \ldots p_B^n(t)]^T$ |
| Link model | achievable data rate for user k on beam b:<br>$$r_b^{k,n}(p_b) = B \log_2\left(1 + \frac{1}{\Gamma} \gamma_b^{k,n}(p_b)\right)$$<br>where<br>Γ: SINR gap to capacity (a function of the desired BER, coding gain and noise margin)<br>$\gamma_b^{k,n}(p_b)$: received SINR for user k from transmitter n on the beam b:<br>$$\gamma_b^{k,n}(p_b) = \frac{g_b^{k,n} p_b^n}{\sum_{b_j \neq b} g_{b_j}^{k,n} p_{b_j}^n + \sum_{m \neq n, m \in \mathcal{N}} \sum_{b_m \in \mathcal{B}_m} g_{b_m}^{k,m} p_{b_m}^m + \sigma_b^k}$$<br>where<br>$p_b^n$: nonnegative transmit power of transmitter n on beam b<br>$g_b^{k,n}$: channel gain b/w transmitter n and user k on beam b during a slot |

TABLE 8-continued $\sigma_b^k$: noise power
$r_b^{k,n}(p_b)$ is potential data rate when the user k is scheduled for service by the transmitter(BS/RS) n on the beam b and its actual data rate is zero when another user is scheduled.
$r_b^{k,n}(p_b, I_b) = I_b^{k,n} r_b^{k,n}(p_b)$ In a communication network according to another embodiment of the present disclosure, the multi-antenna may apply a stochastic gradient-based algorithm to beam power and user allocation based on a plurality of models as shown in Table 8. Through this, the multi-antenna may re-define and solve a problem of selecting a communication node performing relaying and a user to be allocated to each transmission beam as shown in Table 9 below.

TABLE 9

Re-define   Joint power allocation and user scheduling algorithm @ every time (using stochastic gradient-based algorithm to a long-term utility maximization problem, Long-term P):

$$(P): \max_{p[t], I[t]} \sum_{k \in \mathcal{K}_n} \sum_{b \in \mathcal{B}} U'\left(\overline{R}_b^{k,n}[t-1]\right) r_b^{k,n}(p_b, I_b)[t]$$

$$\text{subject to } \sum_{k \in \mathcal{K}_n} I_b^{k,n}[t] \le 1, \forall n \in \mathcal{N} \cup \mathcal{R}, b \in \mathcal{B}_n$$

$$\sum_{b \in \mathcal{B}} p_b^n[t] \le P^{n,max}[t], \forall n \in \mathcal{N} \cup \mathcal{R}$$

$$p_b^n[t] \le p_b^{n,mask}[t], \forall n \in \mathcal{N} \cup \mathcal{R}, b \in \mathcal{B}_n$$

where $\overline{R}_b^{k,n}(p_b, I_b)[t] = (1 - \beta_1)\overline{R}_b^{k,n}(p_b, I_b)[t-1] + \beta_1 r_b^{k,n}(p_b)[t]$, & $\beta_1$ ($\ge 0$) is running averaging parameter Decompose intra-beam user scheduling problems:

Slot-by-slot I (for all beams) user scheduling algorithm for a given power:

$$I_b^{k,n}[t] = \begin{cases} 1, \text{ if } k = k(n, b) = \underset{k \in \mathcal{K}_n}{\arg\max}\, U'\left(\overline{R}_b^{k,n}[t-1]\right) r_b^{k,n}(p_b)[t] \\ 0, \text{ otherwise.} \end{cases}$$

Slot-by-slot P power allocation for a given user scheduling I:

$$(P): \max_{p[t]} \sum_{n \in \cup \mathcal{R}} \sum_{b \in \mathcal{B}_n} U'\left(\overline{R}_b^{k(n,b),n}[t-1]\right) r_b^{k(n,b),n}(p_b)[t]$$

$$\text{subject to } \sum_{b \in \mathcal{B}_n} p_b^n[t] \le P^{n,max}[t], \forall n \in \mathcal{N} \cup \mathcal{R}$$

$$p_b^n[t] \le p_b^{n,mask}[t], \forall n \in \mathcal{N} \cup \mathcal{R}, b \in \mathcal{B}_n$$

where
$\overline{R}_b^{k,n}[t]$: long-term throughput for user k until time slot t & $\overline{R}_b^{k(n,b),n}[t] =$
$(1 - \beta_2)\overline{R}_b^{k(n,b),n}[t-1] + \beta_2 r_b^{k(n,b),n}(p_b)[t]$
$\beta_2(\ge 0)$: running averaing parameter
$r_b^{k(n,b),n}(p_b)$: actual data rate of user k at slot t & feedback from user k at slot t &

$$r_b^{k(n,b),n}(p_b)[t] = \log_2\left(1 + \frac{g_b^{k(n,b),n}[t]p_b^n[t]}{\sum_{b_j \ne b} g_{b_j}^{k(n,b),n}[t]p_{b_j}^n[t] + \sum_{m \ne n, m \in \mathcal{N} \cup \mathcal{R}} \sum_{b_m \in \mathcal{B}_m} g_{b_m}^{k(n,b),m}[t]p_{b_m}^m[t] + \sigma_b^{k(n,b)}[t]}\right)$$

$$g_b^{k(n,b),n}[t]p_b^n[t] = \left|a_r^H(\hat{\psi}, \hat{\phi}) H F_A(\hat{\varphi}, \hat{\theta}) p_{b(\hat{\varphi}, \hat{\theta})}^n[t]\right|^2$$

$$\sum_{b_j \ne b} g_{b_j}^{k(n,b),n}[t]p_{b_j}^n[t] = \sum_{(\overline{\varphi}_h, \overline{\theta}_v) \in \Phi \times \Theta \setminus \{(\hat{\varphi}, \hat{\theta})\}} \left|a_r^H(\hat{\psi}, \hat{\phi}) H F_A(\overline{\varphi}_h, \overline{\theta}_v) p_{b(\overline{\varphi}_h, \overline{\theta}_h)}^n[t]\right|^2$$

$$\sum_{m \ne n, m \in \mathcal{N} \cup \mathcal{R}} \left(\sum_{b_m \in \mathcal{B}_m} g_{b_m}^{k(n,b),m}[t]p_{b_m}^m[t]\right) = \sum_{m \ne n} \left(\sum_{(\overline{\varphi}_h, \overline{\theta}_v) \in \Phi \times \Theta} \left|a_r^H(\hat{\psi}, \hat{\phi}) H F_A(\overline{\varphi}_h, \overline{\theta}_v) p_{b(\overline{\varphi}_h, \overline{\theta}_h)}^m[t]\right|^2\right)$$

Meanwhile, the multi antenna may select a communication node performing relaying and a user to be allocated to each transmission beam at each time slot t (=lT, where l=0, 1, 2, . . . ) based on Tables 8 and 9. Specifically, the multi-antennas may select the communication node performing relaying and the user to be allocated to each transmission beam based on a system (or algorithm) that includes a plurality of steps as shown in Table 10 below. For reference, $r_b^{k,n}(p_b)$ may be $r_{b(p_b)}^{k,n}$ in Table 10.

TABLE 10

Step 1 (slot-by-slot I) optimal user selection for a given power:

$$I_b^{k,n}[t] = \begin{cases} 1, \text{ if } k = k(n,b) = \underset{k \in \mathcal{K}_n}{\arg\max}\, U'\left(R_b^{k,n}[t-1]\right) r_{b(p_b)}^{k,n}[t] \\ 0, \text{ otherwise.} \end{cases}$$

Step 2 (slot-by-slot P) optimal power allocation for a given selected user I:

$$(P): \max_{p[t]} \sum_{n \in \mathcal{N} \cup \mathcal{R}} \sum_{b \in \mathcal{B}_n} U'\left(R_b^{k(n,b),n}[t-1]\right) r_{b(p_b)}^{k(n,b),n}[t]$$

$$\text{subject to } \sum_{b \in \mathcal{B}_n} p_b^n[t] \leq P^{n,max}[t], \forall n \in \mathcal{N} \cup \mathcal{R}$$

$$p_b^n[t] \leq p_b^{n,mask}[t], \forall n \in \mathcal{N} \cup \mathcal{R}, b \in \mathcal{B}_n$$

Step 3 sort required data rate $\bar{r}_{b(p_b)}^{k(n,b),n}[t]\left(\triangleq \bar{r}_{b(p_b)}^{a(k,n,b),n}[t]\right)$ in ascending order of relaying-capable receivers ($k \in \mathcal{K}_n \cap \mathcal{K}_r$)

Required data is reported or estimated based on the beam measurement report $\bar{r}_{b(p_b)}^{a(n,b),n}[t]$: required(expected) data rate of k served by n via beam b with power pb at time t Step 4 determined whether k (j-th receiver in the sorted list from step3) is selected as a relay or not If expected data rate $\bar{r}_{b(p_b)}^{f(k,n,b),n}[t]$ when k is acting as relay ≥ required rate $\bar{r}^{m,n}[t]$ of relayed node m, if served by transmitter n as follows:

$$\bar{r}_{b(p_b)}^{f(k,n,b),n}[t] \geq \sum_{k \in \mathcal{K}_n} \bar{r}^{m,n}[t]$$

where $\bar{r}^{m,n}[t]$ required rate of receiver m, served by BS n or relay node k (if selected) at time t and estimated as follows:

$\bar{r}^{m,n}[t] = (1 - \beta_2)\bar{R}^{m,n}[t-1] + \beta_2(I_b^{m,n}[t-1]r_{b(p_b)}^{m,n})[t-1] +$ $I_b^{m,k}[t-1]r_{b(p_b)}^{m,k}[t-1])$ $\bar{R}^{m,n}[t] = (1 - \beta_1)\bar{R}^{m,n}[t-1] + \beta_1(I_b^{m,n}[t]r_{b(p_b)}^{m,n}[t] + I_b^{m,k}[t]r_{b(p_b)}^{m,k}[t])$ $\beta_1, \beta_2 (\geq 0)$: running averaging parameters $I_b^{m,n}[t] + I_b^{m,k}[t] \leq 1$ or $I_b^{m,n}[t] \times I_b^{m,k}[t] = 0$ $r_{b(p_b)}^{m,k}[t] = r_{b(p_b)}^{a(m,k,b),k}[t] = \ln(1 + \gamma_{b(p_b)}^{a(m,k,b),k}[t])$ $$\gamma_{b(p_b)}^{a(m,k,b),k}[t] \triangleq \frac{g_b^{a(m,k,b),k}[t]p_b^k[t]}{\sum_{b_j \neq b} g_{b_j}^{a(m,k,b),k}[t]p_{b_j}^k[t] + \sum_{n \neq m, n \in \mathcal{N} \cup \mathcal{R}} \sum_{b_n \in \mathcal{B}_n} g_{b_n}^{a(m,k,b),n}[t]p_{b_n}^n[t] + \sigma_b^{a(m,k,b)}[t]}$$

$g_b^{a(m,k,b),k}[t]p_b^k[t] = \left|a_r^H(\hat{\psi}, \hat{\phi})HF_A(\hat{\varphi}, \hat{\theta})p_{b(\hat{\varphi},\hat{\theta})}^k[t]\right|^2$ $\sum_{b_j \neq b} g_{b_j}^{a(m,k,b),k}[t]p_{b_j}^k[t] = \sum_{(\bar{\varphi}_h, \bar{\theta}_v) \in \Phi \times \Theta \setminus \{(\hat{\varphi}, \hat{\theta})\}} \left|a_r^H(\hat{\psi}, \hat{\phi})HF_A(\bar{\varphi}_h, \bar{\theta}_v)p_{b(\bar{\varphi}_h, \bar{\theta}_v)}^k[t]\right|^2$ $\sum_{n \neq m, n \in \mathcal{N} \cup \mathcal{R}} \sum_{b_n \in \mathcal{B}_n} g_{b_n}^{a(m,k,b),n}[t]p_{b_n}^n[t] = \sum_{n \neq m} \sum_{(\bar{\varphi}_h, \bar{\theta}_v) \in \Phi \times \Theta} \left|a_r^H(\hat{\psi}, \hat{\phi})HF_A(\bar{\varphi}_h, \bar{\theta}_v)p_{b(\bar{\varphi}_h, \bar{\theta}_v)}^n[t]\right|^2$ $r_{b(p_b)}^{f(k,n,b),n}[t]$: expected rate of relay node K from transmitter n @ time slot t TABLE 10-continued $$\bar{r}_{b(p_b)}^{f(k,n,b),n}[t]\left(=\sum_{m\in\mathcal{K}_n}\bar{r}_{b(p_b)}^{a(m,n,b),n}[t]\right)=\log_2\left(1+\gamma_{b(p_b)}^{f(k,n,b),n}[t]\right)$$

$$\gamma_{b(p_b)}^{f(k,n,b),n}[t]\triangleq\frac{g_b^{f(k,n,b),n}[t]p_b^n[t]}{\sum_{b_j\neq b}g_{b_j}^{f(k,n,b),n}[t]p_{b_j}^n[t]+\sum_{m\neq n,m\in N\cup R}\sum_{b_m\in\mathcal{B}_m}g_{b_m}^{f(k,n,b),m}[t]p_{b_m}^m[t]+\sigma_b^{f(k,n,b)}[t]}$$

$$g_b^{f(k,n,b),n}[t]p_b^n[t]=\left|a_r^H(\hat{\psi},\hat{\phi})HF_A(\hat{\varphi},\hat{\theta})p_{b(\hat{\varphi},\hat{\theta})}^n[t]\right|^2$$

$$\sum_{b_j\neq b}g_{b_j}^{f(k,n,b),n}[t]p_{b_j}^n[t]=\sum_{(\overline{\varphi}_h,\overline{\theta}_v)\in\Phi\times\Theta\setminus\{(\hat{\varphi},\hat{\theta})\}}\left|a_r^H(\hat{\psi},\hat{\phi})HF_A(\overline{\varphi}_h,\overline{\theta}_v)p_{b(\overline{\varphi}_h,\overline{\theta}_h)}^n[t]\right|^2$$

$$\sum_{m\neq n,m\in N}\sum_{b_m\in\mathcal{B}_m}g_{b_m}^{f(k,n,b),m}[t]p_{b_m}^m[t]=\sum_{m\neq n}\sum_{(\overline{\varphi}_h,\overline{\theta}_v)\in\Phi\times\Theta}\left|a_r^H(\hat{\psi},\hat{\phi})HF_A(\overline{\varphi}_h,\overline{\theta}_v)p_{b(\overline{\varphi}_h,\overline{\theta}_h)}^m[t]\right|^2$$

Step 5 If node k is not selected as a relay but more k is left, j = j + 1 & go to step 4. Else if k is selected as a relay or no more k is left, go to step 6
Step 6 If node k is selected as a relay, node k is in charge of relaying. Otherwise, BS n serves all k (, where $k\in\mathcal{K}_n\cup\mathcal{K}_r$)
Step 7 update $\bar{R}_{b(p_b)}^{k,n}[t]$, $\bar{r}^{k,n}[t]$, $\forall k\in\mathcal{K}_n\cup\mathcal{K}_r$.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method performed in a multi-antenna performing beamforming in a communication network, the operation method comprising:
    selecting a beamformer generating a transmission beam for transmitting data to a plurality of communication nodes included in the communication network among a plurality of beamformers included in the multi-antenna;
    selecting at least one antenna panel corresponding to each of the plurality of communication nodes among a plurality of antenna panels included in the selected beamformer;
    configuring a parameter for respectively allocating an independent transmission beams to each of the plurality of communication nodes based on the selected at least one antenna panel; and
    transmitting data to the plurality of communication nodes using transmission beams through the plurality of antenna panels based on the configured parameter.

2. The operation method according to claim 1, wherein the parameter is one of a sequence of respectively transmitting data to the plurality of communication nodes through the transmission beams, a beam index and a beam width of a transmission beam for transmitting data to each of the plurality of communication nodes.

3. The operation method according to claim 2, wherein, in the transmitting data to the plurality of communication nodes, when the parameter is the sequence of respectively transmitting data to the plurality of communication nodes through the transmission beams, the data is sequentially transmitted to the plurality of communication nodes through the transmission beams according to the sequence of respectively transmitting data.

4. The operation method according to claim 2, wherein the beam index and the beam width are configured differently according to service types supported by the plurality of communication nodes and types of the plurality of communication nodes.

5. The operation method according to claim 4, wherein, in the transmitting data to the plurality of communication nodes, when the parameter is the beam index, the data is transmitted to each of the plurality of communication nodes through a transmission beam having a beam index configured differently according to the service types supported by the plurality of communication nodes and the types of the plurality of communication nodes.

6. The operation method according to claim 4, wherein, in the transmitting data to the plurality of communication nodes, when the parameter is the beam width, the data is transmitted to each of the plurality of communication nodes through a transmission beam having a beam width configured differently according to the service types supported by the plurality of communication nodes and the types of the plurality of communication nodes.

7. The operation method according to claim 1, wherein, in the transmitting data to the plurality of communication nodes, the data is transmitted to the plurality of communication nodes through transmission beams generated by a plurality of antenna elements included in the at least one antenna panel.

8. A multi-antenna performing beamforming in a communication network, the multi-antenna comprising a processor and a memory storing at least one instruction executed by the processor, wherein the at least one instruction is configured to:
- select a beamformer generating a transmission beam for transmitting data to a plurality of communication nodes included in the communication network among a plurality of beamformers included in the multi-antenna;
- select at least one antenna panel corresponding to each of the plurality of communication nodes among a plurality of antenna panels included in the selected beamformer;
- configure a parameter for respectively allocating independent transmission beams to the plurality of communication nodes based on the selected at least one antenna panel; and
- transmit data to the plurality of communication nodes using transmission beams through the plurality of antenna panels based on the configured parameter.

9. The multi-antenna according to claim 8, wherein the parameter is one of a sequence of respectively transmitting data to the plurality of communication nodes through the transmission beams, a beam index and a beam width of a transmission beam for transmitting data to each of the plurality of communication nodes.

10. The multi-antenna according to claim 8, wherein, when the parameter is the sequence of respectively transmitting data to the plurality of communication nodes through the transmission beams in the transmitting data to the plurality of communication nodes, the at least one instruction is further configured to sequentially transmit the data to the plurality of communication nodes through the transmission beams according to the sequence of respectively transmitting data.

11. The multi-antenna according to claim 10, wherein the beam index and the beam width are configured differently according to service types supported by the plurality of communication nodes and types of the plurality of communication nodes.

12. The multi-antenna according to claim 11, wherein, when the parameter is the beam index in the transmitting data to the plurality of communication nodes, the at least one instruction is further configured to transmit the data to each of the plurality of communication nodes through a transmission beam having a beam index configured differently according to the service types supported by the plurality of communication nodes and the types of the plurality of communication nodes.

13. The multi-antenna according to claim 11, wherein, when the parameter is the beam width in the transmitting data to the plurality of communication nodes, the at least one instruction is further configured to transmit the data to each of the plurality of communication nodes through a transmission beam having a beam width configured differently according to the service types supported by the plurality of communication nodes and the types of the plurality of communication nodes.

14. The multi-antenna according to claim 8, wherein, in the transmitting data to the plurality of communication nodes, the at least one instruction is further configured to transmit the data to the plurality of communication nodes through transmission beams generated by a plurality of antenna elements included in the at least one antenna panel.

* * * * *